(12) United States Patent
Teranishi

(10) Patent No.: US 8,121,290 B2
(45) Date of Patent: Feb. 21, 2012

(54) PSEUDO-RANDOM FUNCTION CALCULATING DEVICE AND METHOD AND NUMBER-LIMITED ANONYMOUS AUTHENTICATION SYSTEM AND METHOD

(75) Inventor: Isamu Teranishi, Tokyo (JP)

(73) Assignee: NEC Corporation, Tokyo (JP)

( * ) Notice: Subject to any disclaimer, the term of this patent is extended or adjusted under 35 U.S.C. 154(b) by 998 days.

(21) Appl. No.: 11/915,561

(22) PCT Filed: May 26, 2006

(86) PCT No.: PCT/JP2006/310534
§ 371 (c)(1),
(2), (4) Date: Feb. 28, 2008

(87) PCT Pub. No.: WO2006/126668
PCT Pub. Date: Nov. 30, 2006

(65) Prior Publication Data
US 2009/0041239 A1     Feb. 12, 2009

(30) Foreign Application Priority Data

May 27, 2005   (JP) ................................. 2005-155496

(51) Int. Cl.
*H04L 9/00* (2006.01)
*H04L 9/08* (2006.01)

(52) U.S. Cl. .............. 380/46; 380/44; 380/47; 380/259; 380/262; 380/277; 380/278; 380/282; 380/285; 713/171; 713/180; 713/182; 713/193; 713/194; 726/3; 726/4; 726/9; 726/26; 726/30; 726/34

(58) Field of Classification Search .................... 380/44, 380/46–47
See application file for complete search history.

(56) References Cited

U.S. PATENT DOCUMENTS 5,365,589 A * 11/1994 Gutowitz ........................ 380/43
(Continued)

FOREIGN PATENT DOCUMENTS

JP             07-077934 A       3/1995
(Continued)

OTHER PUBLICATIONS

G. Ateniese, J. Camenisch, M. Joye and G. Tsudik, "A Practical and Provably Secure Coalition—Resistant Group Signature Scheme", In Advances in Cryptology—CRYPTO 2000, vol. 1880 of LNCS, pp. 225-270, Springer-Verlag, 2000.
(Continued)

*Primary Examiner* — Edan Orgad
*Assistant Examiner* — Jenise Jackson
(74) *Attorney, Agent, or Firm* — Sughrue Mion, PLLC

(57) ABSTRACT

An efficient pseudo-random function and an efficient limited number of times authentication system using such a function are realized. A pseudo-random function calculating device comprises a key creating means and a pseudo-random function calculating means. The key creating means creates a public key made of a set of at least a first component and a second component as components constituting an element of a finite group and a secret key made of an integer and secretly saves the created secret key in a secret key memory section but makes the public key public. The pseudo-random function calculating means outputs the element of a finite group as function value of the pseudo-random function upon receiving an integer as input. The pseudo-random function calculating means outputs the product of multiplication of the first element of the value obtained by calculating the modular exponentiation, using the first component of the public key and the input integer respectively as base and exponent, and the second element of the value obtained by calculating the modular exponentiation, using the second component of the public key and the reciprocal of the sum of the secret key and the input integer in a finite field respectively as base and component.

28 Claims, 24 Drawing Sheets

U.S. PATENT DOCUMENTS

| | | | | |
|---|---|---|---|---|
| 6,038,322 | A | * | 3/2000 | Harkins .................. 380/279 |
| 6,665,405 | B1 | * | 12/2003 | Lenstra ................... 380/28 |
| 6,839,839 | B1 | * | 1/2005 | Merkle .................... 713/171 |
| 2003/0123672 | A1 | * | 7/2003 | Srinivasan et al. ......... 380/285 |
| 2005/0015597 | A1 | * | 1/2005 | Higurashi ................. 713/171 |
| 2005/0018841 | A1 | * | 1/2005 | Girault ................... 380/30 |
| 2006/0225126 | A1 | * | 10/2006 | Brown et al. .............. 726/2 |

FOREIGN PATENT DOCUMENTS

| | | |
|---|---|---|
| JP | 2511464 B2 | 4/1996 |
| JP | 2001-094553 A | 4/2001 |
| JP | 2004-228958 A | 12/2004 |

OTHER PUBLICATIONS

Yevgeniy Dodis and Aleksadr Yampolskiy, A Verifiable Random Function With Short Proofs and Keys, [online] Crypotology cPrint archive, Mar. 7, 2005, [retrieved on Aug. 8, 2006]. Retrieved from the Internet: URL:http://eprint.iacr.org/2004/310.pdf.

P.S.L.M. Barreto, H.Y. Kim, B. Lynn, M. Scott, "Efficient Algorithms for Pairing-Based Cryptosystems", In Advances in Cryptology—Crypto '2002, vol. 2442 of LNCS, pp. 354-368, Springer-Verlag, 2002.

Rafael Pass, "On Deniability in the Common Reference String and Random Oracle Model", In Advances in Cryptology—CRYPTO 2003, vol. 2729 of LNCS, pp. 316-337, Springer-Verlag, 2003.

Isamu Teranishi, Jun Furukawa and Kazue Sako, "k-Times Anonymous Authentication (Extended Abstract)", In Advances in Cryptology—ASIACRYPT 2004—vol. 3329 of LNCS, pp. 308-322, Springer-Verlag, 2004.

Oded Goldreich, "Foundation of Cryptography, Basic Tools", Cambridge University Press, ISBN 0-521-79172-3, USA, 2001. pp. 148-169.

* cited by examiner

FIG. 3

KEY FOR PSEUDO-RANDOM FUNCTION CREATING MEANS

S1: RANDOMLY SELECT ELEMENTS g, h OF G.

S2: RANDOMLY SELECT ELEMENT y OF Z_q.

S3: WRITE Y IN SECRET KEY MEMORY SECTION AND (g, h) IN PUBLIC KEY MEMORY SECTION.

S4: OUTPUT (g, h).

PSEUDO-RANDOM FUNCTION CALCULATING MEANS

S5: RECEIVE AS INPUT ELEMENT i OF G.

S6: CALCULATE $f(i) = g^{[i]} h^{[1/(y+i)]}$.

S7: OUTPUT f(i).

FIG.5

KEY FOR PSEUDO-RANDOM FUNCTION CREATING MEANS

S11: RANDOMLY SELECT ELEMENT y OF Z_q.

S12: WRITE Y IN THE SECRET KEY MEMORY SECTION.

PSEUDO-RANDOM FUNCTION CALCULATING MEANS

S13: RECEIVE AS INPUT BIT STRING X AND ELEMENT i OF G_1.

S14: CALCULATE (g_{X}, h_{X}) = H_{G_1^2}(X).

S15: CALCULATE f[y]_{ω}(i, X) = g_{X}^{i}h_{X}^{1/(y + i)}.

S16: OUTPUT f[y]_{ω}(i, X).

FIG. 8

KEY FOR ELECTRONIC PROOF CREATING MEANS

S41: RANDOMLY SELECT ELEMENT g_2 OF G_2.

S42: RANDOMLY SELECT ELEMENT g'_2 OF H_2.

S43: RANDOMLY SELECT ELEMENT ssk OF Z_q.

S44: CALCULATE h'_2 = g'_2^{ssk}.

S45: SET (g_2, g'_2, h'_2) AS PUBLIC KEY FOR ELECTRONIC SIGNATURE spk.

ELECTRONIC SIGNATURE MEANS

S46: PARSE SPK AS (g_2, g'_2, h'_2).

S47: CALCULATE SIGNED TEXT S = g_2^{1/(ssk + $\beta$)} FOR PLAIN TEXT $\beta$.

FIG. 16

KEY FOR ISSUER CREATING MEANS

S131: RANDOMLY SELECT ELEMents g_3, h_3, a_3 OF G_2.

S132: RANDOMLY SELECT ELEMENT g'_3 OF H_2.

S133: RANDOMLY SELECT ELEMENT gsk OF Z_q.

S134: CALCULATE u'_3 = g_3^{ssk}.

S135: SET (g_3, h_3, a_3, g'_3, u'_3) AS PUBLIC KEY FOR ISSUER gpk.

FIG.21

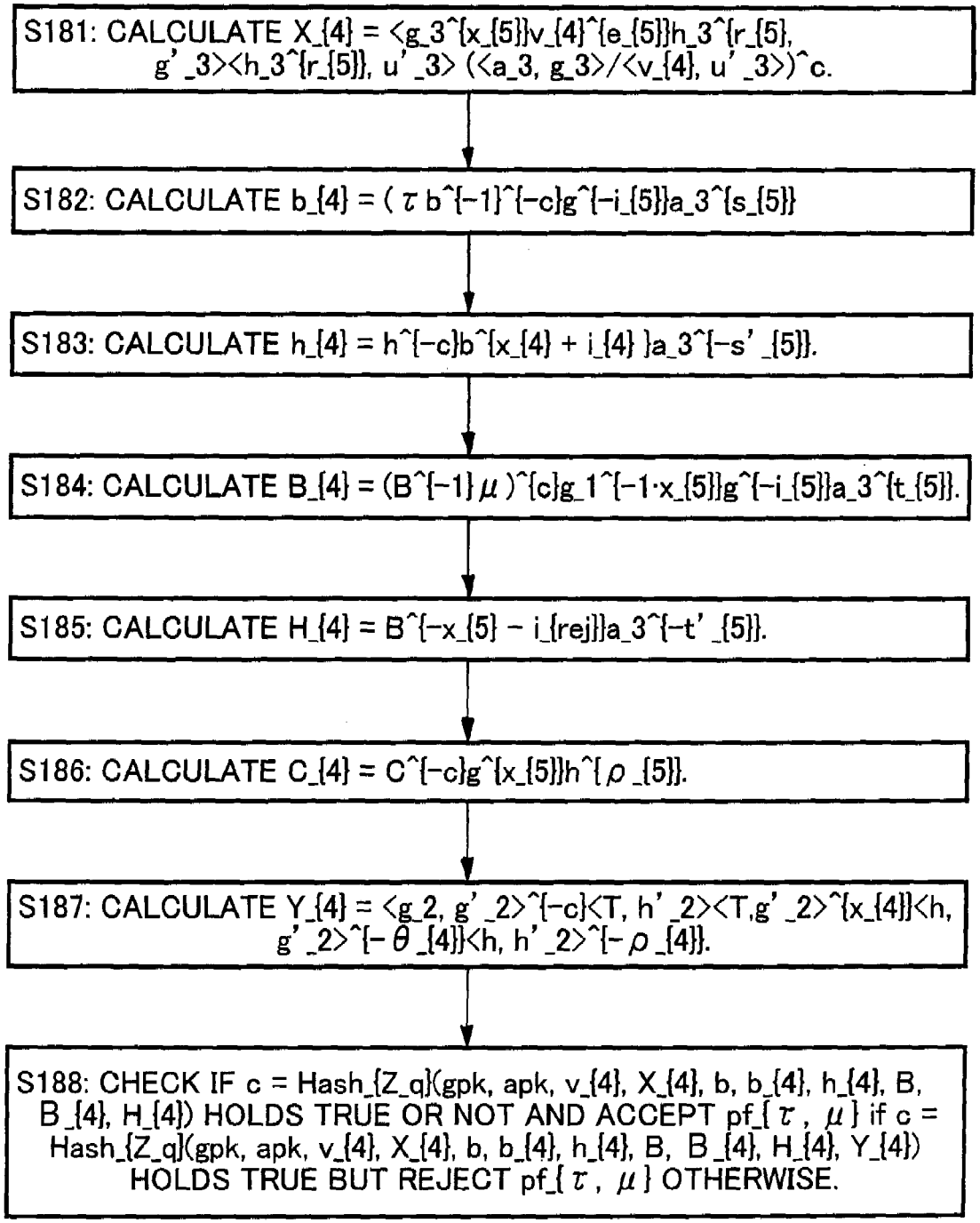

S181: CALCULATE $X_{\{4\}} = \langle g\_3^{\{x_{\{5\}}\}} v_{\{4\}}^{\{e_{\{5\}}\}} h\_3^{\{r_{\{5\}}\}}, g'\_3 \rangle \langle h\_3^{\{r_{\{5\}}\}}, u'\_3 \rangle (\langle a\_3, g\_3 \rangle / \langle v_{\{4\}}, u'\_3 \rangle)^c$.

S182: CALCULATE $b_{\{4\}} = (\tau b^{\{-1\}})^{\{-c\}} g^{\{-i_{\{5\}}\}} a\_3^{\{s_{\{5\}}\}}$ S183: CALCULATE $h_{\{4\}} = h^{\{-c\}} b^{\{x_{\{4\}} + i_{\{4\}}\}} a\_3^{\{-s'_{\{5\}}\}}$.

S184: CALCULATE $B_{\{4\}} = (B^{\{-1\}} \mu)^{\{c\}} g\_1^{\{-1 \cdot x_{\{5\}}\}} g^{\{-i_{\{5\}}\}} a\_3^{\{t_{\{5\}}\}}$.

S185: CALCULATE $H_{\{4\}} = B^{\{-x_{\{5\}} - i_{\{rej\}}\}} a\_3^{\{-t'_{\{5\}}\}}$.

S186: CALCULATE $C_{\{4\}} = C^{\{-c\}} g^{\{x_{\{5\}}\}} h^{\{\rho_{\{5\}}\}}$.

S187: CALCULATE $Y_{\{4\}} = \langle g\_2, g'\_2 \rangle^{\{-c\}} \langle T, h'\_2 \rangle \langle T, g'\_2 \rangle^{\{x_{\{4\}}\}} \langle h, g'\_2 \rangle^{\{-\theta_{\{4\}}\}} \langle h, h'\_2 \rangle^{\{-\rho_{\{4\}}\}}$.

S188: CHECK IF $c = \text{Hash}\_{\{Z\_q\}}(gpk, apk, v_{\{4\}}, X_{\{4\}}, b, b_{\{4\}}, h_{\{4\}}, B, B_{\{4\}}, H_{\{4\}})$ HOLDS TRUE OR NOT AND ACCEPT $pf\{\tau, \mu\}$ if $c = \text{Hash}\_{\{Z\_q\}}(gpk, apk, v_{\{4\}}, X_{\{4\}}, b, b_{\{4\}}, h_{\{4\}}, B, B_{\{4\}}, H_{\{4\}}, Y_{\{4\}})$ HOLDS TRUE BUT REJECT $pf\{\tau, \mu\}$ OTHERWISE.

FIG.22

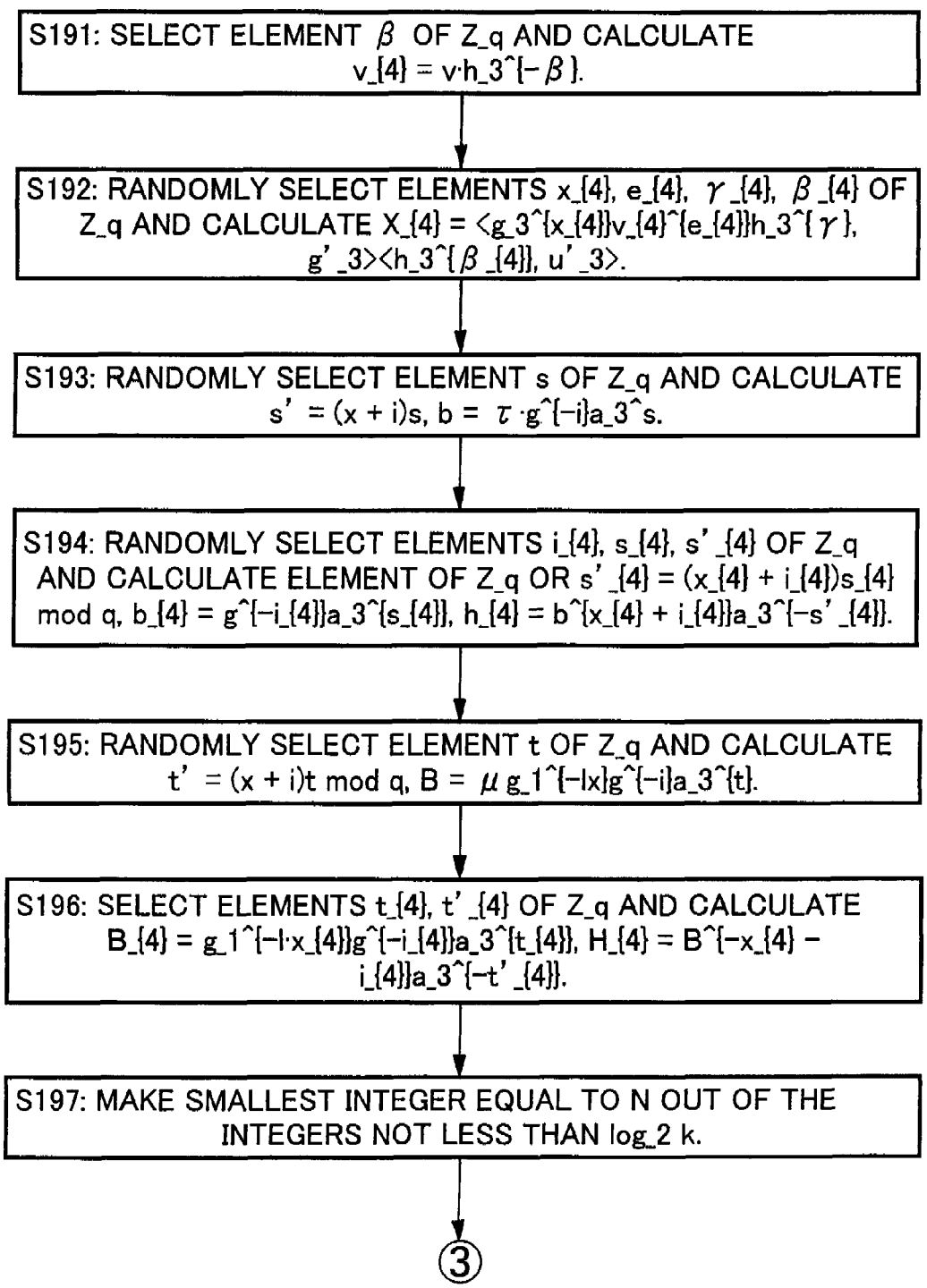

S191: SELECT ELEMENT $\beta$ OF $Z\_q$ AND CALCULATE
$v\_\{4\} = v \cdot h\_3^{\{-\beta\}}$.

S192: RANDOMLY SELECT ELEMENTS $x\_\{4\}$, $e\_\{4\}$, $\gamma\_\{4\}$, $\beta\_\{4\}$ OF $Z\_q$ AND CALCULATE $X\_\{4\} = \langle g\_3^{\{x\_\{4\}\}} v\_\{4\}^{\{e\_\{4\}\}} h\_3^{\{\gamma\}}, g'\_3 \rangle \langle h\_3^{\{\beta\_\{4\}\}}, u'\_3 \rangle$.

S193: RANDOMLY SELECT ELEMENT s OF $Z\_q$ AND CALCULATE
$s' = (x + i)s$, $b = \tau \cdot g^{\{-i\}} a\_3^{\wedge}s$.

S194: RANDOMLY SELECT ELEMENTS $i\_\{4\}$, $s\_\{4\}$, $s'\_\{4\}$ OF $Z\_q$ AND CALCULATE ELEMENT OF $Z\_q$ OR $s'\_\{4\} = (x\_\{4\} + i\_\{4\})s\_\{4\}$ mod q, $b\_\{4\} = g^{\{-i\_\{4\}\}} a\_3^{\{s\_\{4\}\}}$, $h\_\{4\} = b^{\{x\_\{4\} + i\_\{4\}\}} a\_3^{\{-s'\_\{4\}\}}$.

S195: RANDOMLY SELECT ELEMENT t OF $Z\_q$ AND CALCULATE
$t' = (x + i)t$ mod q, $B = \mu g\_1^{\{-lx\}} g^{\{-i\}} a\_3^{\{t\}}$.

S196: SELECT ELEMENTS $t\_\{4\}$, $t'\_\{4\}$ OF $Z\_q$ AND CALCULATE
$B\_\{4\} = g\_1^{\{-l \cdot x\_\{4\}\}} g^{\{-i\_\{4\}\}} a\_3^{\{t\_\{4\}\}}$, $H\_\{4\} = B^{\{-x\_\{4\} - i\_\{4\}\}} a\_3^{\{-t'\_\{4\}\}}$.

S197: MAKE SMALLEST INTEGER EQUAL TO N OUT OF THE INTEGERS NOT LESS THAN $\log\_2 k$.

S198: MAKE i-TH BIT OF x EQUAL TO $x_i$ AND $x'_i = 1 - x_i$ AND $z = k - x$ HOLD TRUE AND ALSO MAKE i-TH BIT OF z EQUAL TO $z_i$ AND $z'_i = 1 - z_i$ HOLD TRUE FOR INTEGERS $i = 0, \cdots, N$.

↓

S199: SELECT ANY OF $\rho\_1, \cdots, \rho\_N, \theta\_1, \cdots \theta\_N$ of $Z\_q$ THAT HOLD $\rho\_1 + \cdots + \rho\_N = \theta\_1 + \cdots + \theta\_N$ TRUE AND CALCULATE $\rho = \rho\_1 + \cdots + \rho\_N$, $C\_1 = h^{\{\rho\_1\}}, \cdots, C\_N = h^{\{\rho\_N\}}$, $D\_1 = h^{\{\theta\_1\}}, \cdots, D\_N = h^{\{\theta\_N\}}$, $C = g^{\{x\}}h^{\{\rho\}}$, $D = g^{\{k-x\}}h^{\{\rho\}}$.

↓

S200: RANDOMLY SELECT ELEMENTS $\rho\_\{4, i\}, \theta\_\{4, i\}, c'\_\{i, x'\_i\}, d'\_\{i, z'\_i\}, \rho\_\{5, i, x'\_i\}, \theta\_\{5, i, z'\_i\}$ of $Z\_q$ for $i = 1, \cdots, N, j = 0, 1$ AND CALCULATE $C\_(4, i, x'\_i) = g^{\{x\_i\}}h^{\{\rho\_\{4, i\}\}}$, $D\_\{4, i, x\_i\} = g^{\{z\_i\}}h^{\{\theta\_\{4, i\}\}}$, $C\_\{4, i, x'\_i\} = C^{\{-c'\_\{i, x'\_i\}\}}h^{\{\rho\_\{5, i, x'\_i\}\}}$, $D\_\{4, i, x'\_i\} = D^{\{-d'\_\{i, z'\_i\}\}}g^{\{z'\_i\}}h^{\{\theta\_\{5, i, z'\_i\}\}}$.

↓

S201: CALCULATE $c = \text{Hash}\_\{Z\_q\}(gpk, apk, v\_\{4\}, X\_\{4\}, b, b\_\{4\}, h\_\{4\}, B, B\_\{4\}, H\_\{4\}, C\_\{4\}, \{C\_\{4, i, j\}\}\_\{i = 1, \cdots, N, j = 0, 1\}, \{D\_\{4, i, j\}\}\_\{i = 1, \cdots, N, j = 0, 1\})$.

↓

S202: CALCULATE $x\_\{5\} = cx + x\_\{4\} \bmod q$, $e\_\{5\} = ce + e\_\{4\} \bmod q$, $r\_\{5\} = c(r + \beta e) + \gamma \bmod q$, $i\_\{5\} = ci + i\_\{4\} \bmod q$, $s\_\{5\} = cs + s\_\{4\} \bmod q$, $s'\_\{5\} = cs' + s'\_\{4\} \bmod q$, $t\_\{5\} = ct + t\_\{4\} \bmod q$, $t'\_\{5\} = ct' + t'\_\{4\} \bmod q$, $c\_i = c - c'\_i \bmod q$, $d\_i = d - d'\_i \bmod q$, $\rho\_\{5, i, x\_i\} = c\_i \rho\_i + \rho\_\{4, i\} \bmod q$, $\theta\_\{5, i, x\_i\} = c\_i \theta\_i + \theta\_\{4, i\} \bmod q$.

↓

S203: MAKE $pf\_\{\tau, \mu\} = (b, B, C, c, x\_\{5\}, e\_\{5\}, r\_\{5\}, i\_\{5\}, s\_\{5\}, s'\_\{5\}, t\_\{5\}, t'\_\{5\}, \{c\_\{i\}\}\})$ HOLD TRUE.

FIG.24

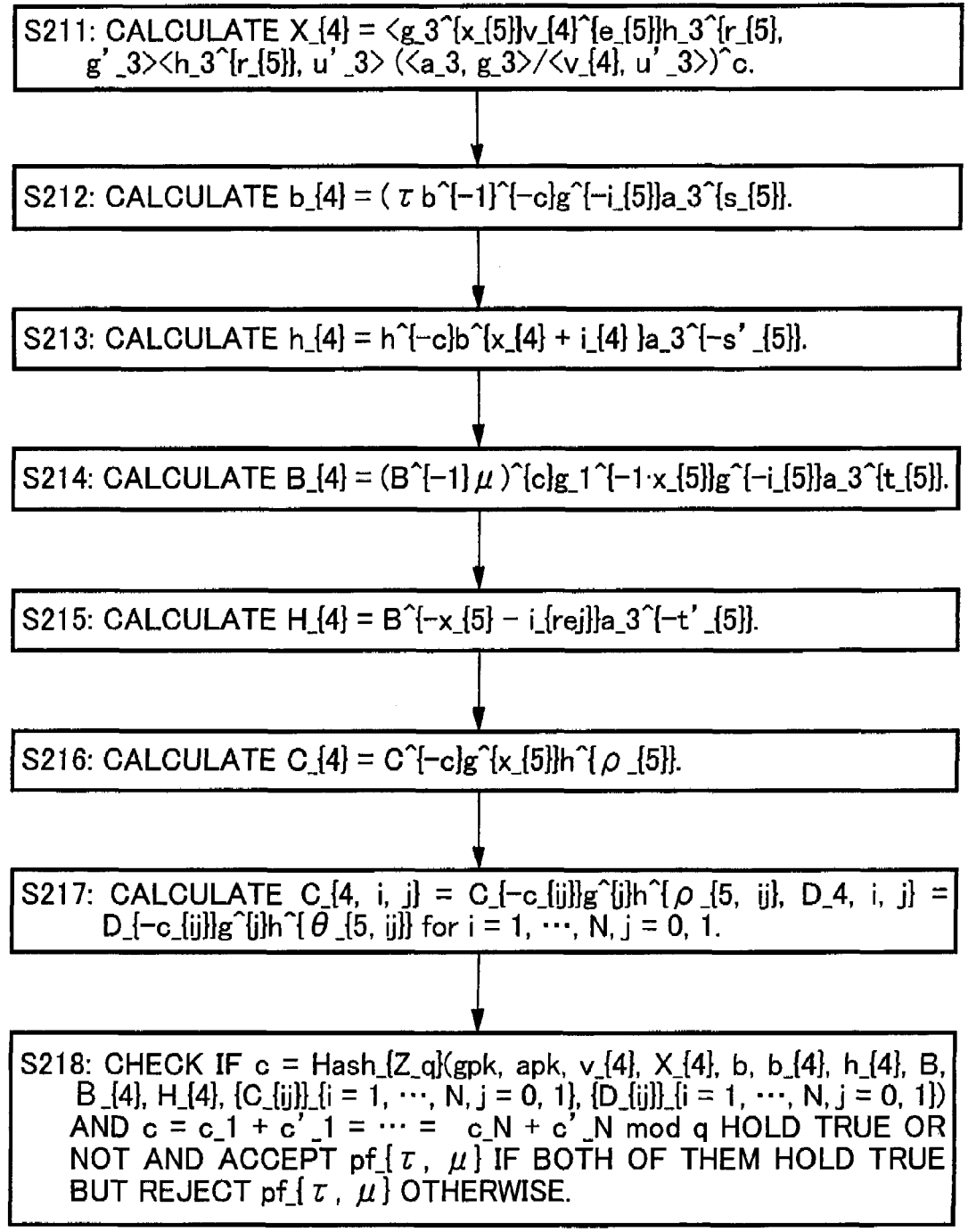

S211: CALCULATE $X_{\{4\}} = \langle g\_3^{\{x_{\{5\}}\}}v_{\{4\}}^{\{e_{\{5\}}\}}h\_3^{\{r_{\{5\}}\}}, g'\_3\rangle\langle h\_3^{\{r_{\{5\}}\}}, u'\_3\rangle (\langle a\_3, g\_3\rangle/\langle v_{\{4\}}, u'\_3\rangle)^c$.

S212: CALCULATE $b_{\{4\}} = (\tau b^{\{-1\}})^{\{-c\}}g^{\{-i_{\{5\}}\}}a\_3^{\{s_{\{5\}}\}}$.

S213: CALCULATE $h_{\{4\}} = h^{\{-c\}}b^{\{x_{\{4\}} + i_{\{4\}}\}}a\_3^{\{-s'_{\{5\}}\}}$.

S214: CALCULATE $B_{\{4\}} = (B^{\{-1\}}\mu)^{\{c\}}g\_1^{\{-1 \cdot x_{\{5\}}\}}g^{\{-i_{\{5\}}\}}a\_3^{\{t_{\{5\}}\}}$.

S215: CALCULATE $H_{\{4\}} = B^{\{-x_{\{5\}} - i_{\{rej\}}\}}a\_3^{\{-t'_{\{5\}}\}}$.

S216: CALCULATE $C_{\{4\}} = C^{\{-c\}}g^{\{x_{\{5\}}\}}h^{\{\rho_{\{5\}}\}}$.

S217: CALCULATE $C_{\{4, i, j\}} = C_{\{-c_{\{ij\}}\}}g^{\{ij\}}h^{\{\rho_{\{5, ij\}}\}}$, $D\_4, i, j = D_{\{-c_{\{ij\}}\}}g^{\{ij\}}h^{\{\theta_{\{5, ij\}}\}}$ for $i = 1, \cdots, N, j = 0, 1$.

S218: CHECK IF $c = \text{Hash}_{\{Z\_q\}}(gpk, apk, v_{\{4\}}, X_{\{4\}}, b, b_{\{4\}}, h_{\{4\}}, B, B_{\{4\}}, H_{\{4\}}, \{C_{\{ij\}}\}_{\{i = 1, \cdots, N, j = 0, 1\}}, \{D_{\{ij\}}\}_{\{i = 1, \cdots, N, j = 0, 1\}})$ AND $c = c\_1 + c'\_1 = \cdots = c\_N + c'\_N \bmod q$ HOLD TRUE OR NOT AND ACCEPT $pf_{\{\tau, \mu\}}$ IF BOTH OF THEM HOLD TRUE BUT REJECT $pf_{\{\tau, \mu\}}$ OTHERWISE.

PSEUDO-RANDOM FUNCTION CALCULATING DEVICE AND METHOD AND NUMBER-LIMITED ANONYMOUS AUTHENTICATION SYSTEM AND METHOD

TECHNICAL FIELD

This invention relates to a pseudo-random function calculating device and a pseudo-random function calculating method as well as to a number-limited anonymous authentication system and a number-limited anonymous authentication method. More particularly, the present invention relates to an efficient pseudo-random function and an efficient number-limited anonymous authentication system using the same.

BACKGROUND ART

Techniques for realizing a pseudo-random function by using a one-directional function are known (refer to, e.g., Non-Patent Document 5). However, a pseudo-random function f realized by such a technique cannot efficiently give a zero knowledge proof of knowledge of x that satisfies y=f(x). A technique for efficiently giving a zero knowledge proof of knowledge of x that satisfies y=f(x) can be used to efficiently realize various cryptographic protocols. Therefore, there is a demand for efficient pseudo-random functions.

Meanwhile, many applications such as electronic voting, electronic money, electronic coupons and limited number of times of viewing/listening need to be used by anonymous users in order to protect the privacy of users. At the same time, the number of times for which a user can use such an application needs to be limited.

Number-limited anonymous authentication systems (refer to, e.g., Non-Patent Document 4) are systems suitable for realizing such applications. As a user utilizes such an application, the application provider (AP) authenticates the user by means of such a system so that the application provider provides the application to the user if the user is an honest user who observes the limit of number of times, where as the user can be identified if the user is not honest.

Particularly, the Non-Patent Document 4 proposes a scheme for counting the number of times of authentication of an anonymous user and realizes a number-limited anonymous authentication system by combining a member adding procedure using an ACJT group signature scheme (refer to, e.g., Non-Patent Document 1) and a tag mechanism.

However, the tag mechanism employed in the above-described number-limited anonymous authentication system is poorly efficient and, at the time of authentication, both the AP and the user have to calculate the modular exponentiation of the number of times proportional to the limited number of times k. For example, in the case of an electronic coupon or limited number of times of viewing/listening, the limited number of times may often exceed 10. Thus, the system of the above-cited Non-Patent Document 4 is poorly efficient if employed in such applications.

Non-Patent Document 1: G. Ateniese, J. Camenisch, M. Joye and G. Tsudik, "A Practical and Provably Secure Coalition—Resistant Group Signature Scheme", In Advances in Cryptology—CRYPTO 2000, vol. 1880 of LNCS, pp. 255-270, Springer-Verlag, 2000

Non-Patent Document 2: P. S. L. M. Barreto, H. Y. Kim, B. Lynn, M. Scott, "Efficient Algorithms for Pairing-Based Cryptosystems", In Advances in Cryptology—Crypto '2002, vol. 2442 of LNCS, pp. 354-368, Springer-Verlag, 2002

Non-Patent Document 3: Rafael Pass, "On Deniability in the Common Reference String and Random Oracle Model", In Advances in Cryptology—CRYPTO 2003, vol. 2729 of LNCS, pp. 316-337, Springer-Verlag, 2003

Non-Patent Document 4: Isamu Teranishi, Jun Furukawa and Kazue Sako, "k-Times Anonymous Authentication (Extended Abstract)", In Advances in Cryptology—ASIACRYPT 2004, vol. 3329 of LNCS, pp. 308-322, Springer-Verlag, 2004

Non-Patent Document 5: Oded Goldreich, "Foundation of Cryptography, Basic Tools", Cambridge University Press, ISBN 0-521-79172-3, USA, 2001. pp. 148-169

DISCLOSURE OF THE INVENTION

Problems to be Solved by the Invention

The problem of the existing pseudo-random functions is that such a pseudo-random function f cannot efficiently give a zero knowledge proof of knowledge of x that satisfies y=f(x). The reason is that the method of calculating f is complex.

The problem of the existing number-limited anonymous authentication systems is that the amount of calculations imposed on the user at the time of authentication is proportional to the limited number of times k.

In view of the above-identified circumstances, it is therefore the object of the present invention to provide an efficient pseudo-random function and an efficient limited number of times authentication system realized by using such a function.

Means for Solving the Problems

In an aspect of the present invention, the above problems are dissolved by providing a pseudo-random function calculating device comprising: a key creating means for creating a public key made of a set of at least a first component and a second component as components constituting an element of a finite group and a secret key made of an integer, secretly saving the generated secret key in a memory device and opening the public key; and a pseudo-random function calculating means for outputting the element of a finite group as function value of the pseudo-random function upon receiving an integer as input, wherein the pseudo-random function calculating means outputs as the element of a finite group the product of multiplication of the first element of the value obtained by calculating the modular exponentiation, using the first component of the public key and the input integer respectively as base and exponent, and the second element of the value obtained by calculating the modular exponentiation, using the second component of the public key and the reciprocal of the sum of the secret key and the input integer in a finite field respectively as base and exponent.

In another aspect of the present invention, there is provided a pseudo-random function calculating device comprising: a key creating means for creating a secret key made of an integer and secretly saving the generated secret key in a memory device; and a pseudo-random function calculating means for outputting an element of a finite group as function value of a pseudo-random function upon receiving a set of a bit string and an integer as input, wherein the pseudo-random function calculating means outputs as the element of a finite group the product of multiplication of the first element of the value obtained by calculating the modular exponentiation, using a value determined by the input value and the input integer respectively as base and exponent, and the second element of the value obtained by calculating the modular exponentiation, using a value determined by the input value and the reciprocal of the sum of the secret key and the input integer respectively as base and exponent. In a pseudo-random function calculating device as defined above, the base may be the Hash value of the input value.

In still another aspect of the present invention, there is provided a number-limited anonymous authentication system using either of the above defined pseudo-random function calculating devices, comprising a tag creating means having: an input means for receiving an identifier, integers k, i, y and l and element t of a finite group; a first tag calculating means for receiving the value determined by means of the identifier, the k and the i, using the y as secret key, and calculating the function value of a pseudo-random function taking a value in the finite group; a second tag calculating means for receiving the value determined by means of the identifier, the k and the i, using the y as secret key, and calculating the function value of the pseudo-random function taking a value in the finite group and then the product of multiplication of the value obtained by raising the calculated pseudo-random function by the l-th power and t; and an output means for outputting a set of the outcome of calculation of the first tag calculating means and the outcome of calculation of the second tag calculating means.

A number-limited anonymous authentication system as defined above may further comprise: a key for tag creating means including: an input means for receiving integer k as input; a key for electronic signature creating means for selecting a pair of a public key and a secret key of an electronic signature system; a plain text selecting means for selecting k integers; an electronic signature calculating means for determining by calculations a signature text for each of the k integers by using the pair of a public key and a secret key; and an output means for outputting a set of the public key of the electronic signature system, the k integers and the k signed texts as public key for tag to be used for the calculation of the tag creating means.

The electronic signature calculating means may include: a means for receiving as input an integer as a plain text; a means for calculating an inverse element in a finite field of the sum of a plain text and an integer; and a means for calculating the modular exponentiation, using the calculated inverse element as exponent, and outputting the outcome of calculation of the modular exponentiation as the public key for tag.

The key for electronic signature creating means may include: a means for selecting an element from a finite group; a means for selecting an integer; a means for calculating the modular exponentiation, using the element and the integer respectively as base and exponent; and a means for outputting a set of the selected element of a finite group and the outcome of the calculation of the modular exponentiation.

A number-limited anonymous authentication system as defined above may further comprise: a member identifying information extracting means including: an input means for receiving four data of $\tau$, l, $\tau'$ and l', where $\tau$ is the outcome of the calculation made by inputting integer l to the tag creating means and $\tau'$ is the outcome of the calculation made by inputting l' to the tag creating means; a calculating means for calculating the modular exponentiation, using the value obtained by dividing the $\tau$ by the $\tau'$ and the reciprocal of the value obtained by subtracting the l' from the l in a finite field respectively as base and exponent; and an output means for outputting the outcome of the calculation of the modular exponentiation.

A number-limited anonymous authentication system as defined above may further comprise: a group proving means including: an input means for receiving a pair of a public key and a secret key as group member, the public key of an application provider (to be referred to as AP herein after) device, the identifier of the AP device and integers k, i and l; a means for producing integer y from the secret key as group member, receiving as input the identifier of the AP device and the k, i, l and y and calculating data for forming a tag by means of the tag creating means;

a correctness proving means for calculating a correctness proof text of the tag; and an output means for outputting the tag and the correctness proof text.

A number-limited anonymous authentication system as defined above may further comprise: a tracing means including: an input means for receiving as input a first set having element $\tau$ of a finite group, element $\mu$ of a finite group, integer l and proof text p and a second set having element $\tau'$ of a finite group, element $\mu'$ of a finite group, integer l' and proof text p'; a first determining means for determining if the $\tau$ and the $\tau'$ are the same or not; a second determining means for determining if the l and the l' are the same or not; a third determining means for determining if the proof text p is correct or not; a fourth determining means for determining if the proof text p' is correct or not; and an identifier acquiring means for acquiring an identifier corresponding to the outcome of calculation of the member identifying information extracting means based on the previously set correspondence table.

In still another aspect of the present invention, there is provided a pseudo-random function calculating method comprising: a key creating step of creating a public key made of a set of at least a first component and a second component as components constituting an element of a finite group and a secret key made of an integer, secretly saving the created secret key in a memory device and opening the created public key; and a pseudo-random function calculating step of outputting the element of a finite group as function value of the pseudo-random function upon receiving an integer as input, wherein the pseudo-random function calculating step outputs as the element of a finite group the product of multiplication of the first element of the value obtained by calculating the modular exponentiation, using the first component of the public key and the input integer respectively as base and exponent, and the second element of the value obtained by calculating the modular exponentiation, using the second component of the public key and the reciprocal of the sum of the secret key and the input integer in a finite field respectively as base and exponent.

In another aspect of the present invention, there is provided a pseudo-random function calculating method comprising: a key creating step of creating a secret key made of an integer and secretly saving the created secret key in a memory device; and a pseudo-random function calculating step of outputting an element of a finite group as function value of a pseudo-random function upon receiving a set of a bit string and an integer as input, wherein the pseudo-random function calculating step outputs as the element of a finite group the product of multiplication of the first element of the value obtained by calculating the modular exponentiation, using a value determined by the input value and the input integer respectively as base and exponent, and the second element of the value obtained by calculating the modular exponentiation, using a value determined by the input value and the reciprocal of the sum of the secret key and the input integer respectively as base and exponent. In the present invention, the base may be the Hash value of the input value.

In still another aspect of the present invention, there is provided a number-limited anonymous authentication method using either of the above defined pseudo-random function calculating methods, comprising: a tag creating step including: an input step of receiving an identifier, integers k, i, y and l and element t of a finite group; a first tag calculating step of receiving the value determined by means of the identifier, the k and the i, using the y as secret key, and calculating the function value of a pseudo-random function taking a value in the finite group; a second tag calculating step of receiving the value determined by means of the identifier, the k and the i, using the y as secret key, and calculating the function value of the pseudo-random function taking a value in the finite group and then the product of multiplication of the value obtained by raising the calculated pseudo-random function by the l-th power and t; and a step of outputting a set of the outcome of calculation of the first tag calculating step and the outcome of calculation of the second tag calculating step.

A number-limited anonymous authentication method as defined above may further comprise: a key for tag creating step including: an input step of receiving integer k as input; a key for electronic signature creating step of selecting a pair of a public key and a secret key of an electronic signature system; a plain text selecting step of selecting k integers; an electronic signature calculating step of determining by calculations a signature text for each of the k integers by using the pair of a public key and a secret key; and a step of outputting a set of the public key of the electronic signature system, the k integers and the k signed texts as public key for tag to be used in the calculation of the tag creating step.

The electronic signature calculating step may include: a step of receiving as input an integer as a plain text; a step of calculating an inverse element in a finite field of the sum of a plain text and an integer; and a step of calculating the modular exponentiation, using the calculated inverse element as exponent, and outputting the outcome of calculation of the modular exponentiation as the public key for tag.

The key for electronic signature creating step may include: a step of selecting an element from a finite group; a step of selecting an integer; a step of calculating the modular exponentiation, using the element and the integer respectively as base and exponent; and a step of outputting a set of the selected element of a finite group and the outcome of the calculation of the modular exponentiation.

A number-limited anonymous authentication method as defined above may further comprise: a member identifying information extracting step including: an input step of receiving four data of $\tau$, l, $\tau'$ and l', where $\tau$ is the outcome of the calculation made by inputting integer l in the tag creating step and $\tau'$ is the outcome of the calculation made by inputting l' in the tag creating step; a calculating step of calculating the modular exponentiation, using the value obtained by dividing the $\tau$ by the $\tau'$ and the reciprocal of the value obtained by subtracting the l' from the l in a finite field respectively as base and exponent; and an output step of outputting the outcome of the calculation of the modular exponentiation.

A number-limited anonymous authentication method as defined above may further comprise: a group proving step including: an input step of receiving a pair of a public key and a secret key as group member, the public key of an application provider (to be referred to as AP herein after) device, the identifier of the AP device and integers k, i and l; a step of producing integer y from the secret key as group member, receiving as input the identifier of the AP device and the k, i, l and y and calculating data for forming a tag by means of the tag creating means; a step of calculating a correctness proof text of the tag; and a step of outputting the tag and the correctness proof text.

A number-limited anonymous authentication system as defined above may further comprise: a tracing step including: an input step of receiving as input a first set having element $\tau$ of a finite group, element $\mu$ of a finite group, integer l and proof text p and a second set having element $\tau'$ of a finite group, element $\mu'$ of a finite group, integer l' and proof text p; a first determining step of determining if the $\tau$ and the $\tau'$ are the same or not; a second determining step of determining if the l and the l' are the same or not; a third determining step of determining if the proof text p is correct or not; a fourth determining step of determining if the proof text p' is correct or not; and an acquiring step of acquiring an identifier corresponding to the outcome of calculation of the member identifying information extracting means based on a previously set corresponding table.

Advantages of the Invention

Thus, according to the present invention, it is possible to realize an efficient pseudo-random function and an efficient limited number of times authentication system using such a function.

Namely, the pseudo-random function can be used to calculate the function value by way of a small number of times of calculations of a reciprocal. The calculation algorithm for calculating the function value is simplified to make it possible to efficiently give a zero knowledge proof of knowledge of x that satisfies y=f(x) and hence dissolve the problems of the existing pseudo-random functions.

As for number-limited anonymous authentication according to the present invention, the number of data that the user is required to calculate is O(log k) unlike the known number-limited anonymous authentication techniques. Therefore, the quantity of calculation on the part of the user at the time of authentication is not proportional to the limited number of times k.

BRIEF DESCRIPTION OF THE DRAWINGS

FIG. 3 is a flowchart illustrating the process sequence of the key for pseudo-random function creating means and the pseudo-random function calculating means of FIG. 2 (Example 1);

FIG. 5 is a flowchart illustrating the process sequence of the key for pseudo-random function creating means and the pseudo-random function calculating means of FIG. 4 (Example 2);

FIG. 8 is a flowchart illustrating the process sequence of the key for electronic signature creating means and the electronic signature means that are employed in the key for tag creating means of FIG. 7 (Example 3);

FIG. 16 is a flowchart of the process sequence of the key for issuer creating means that is employed in the GM setup means of FIG. 1 (Example 5);

FIG. 21 is a flowchart of the process sequence of the correctness verifying method of the proof text of the AP device of FIG. 1 (Example 5);

FIG. 22 is a flowchart of the process sequence of the proof text preparing method of the user device of FIG. 1 (Example 6);

FIG. 23 is a flowchart of the process sequence of the proof text preparing method of the user device of FIG. 1 (Example 6); and FIG. 24 is a flowchart of the process sequence of the proof text preparing method of the AP device of FIG. 1 (Example 6).

EXPLANATION OF REFERENCE SYMBOLS

Figure 1:
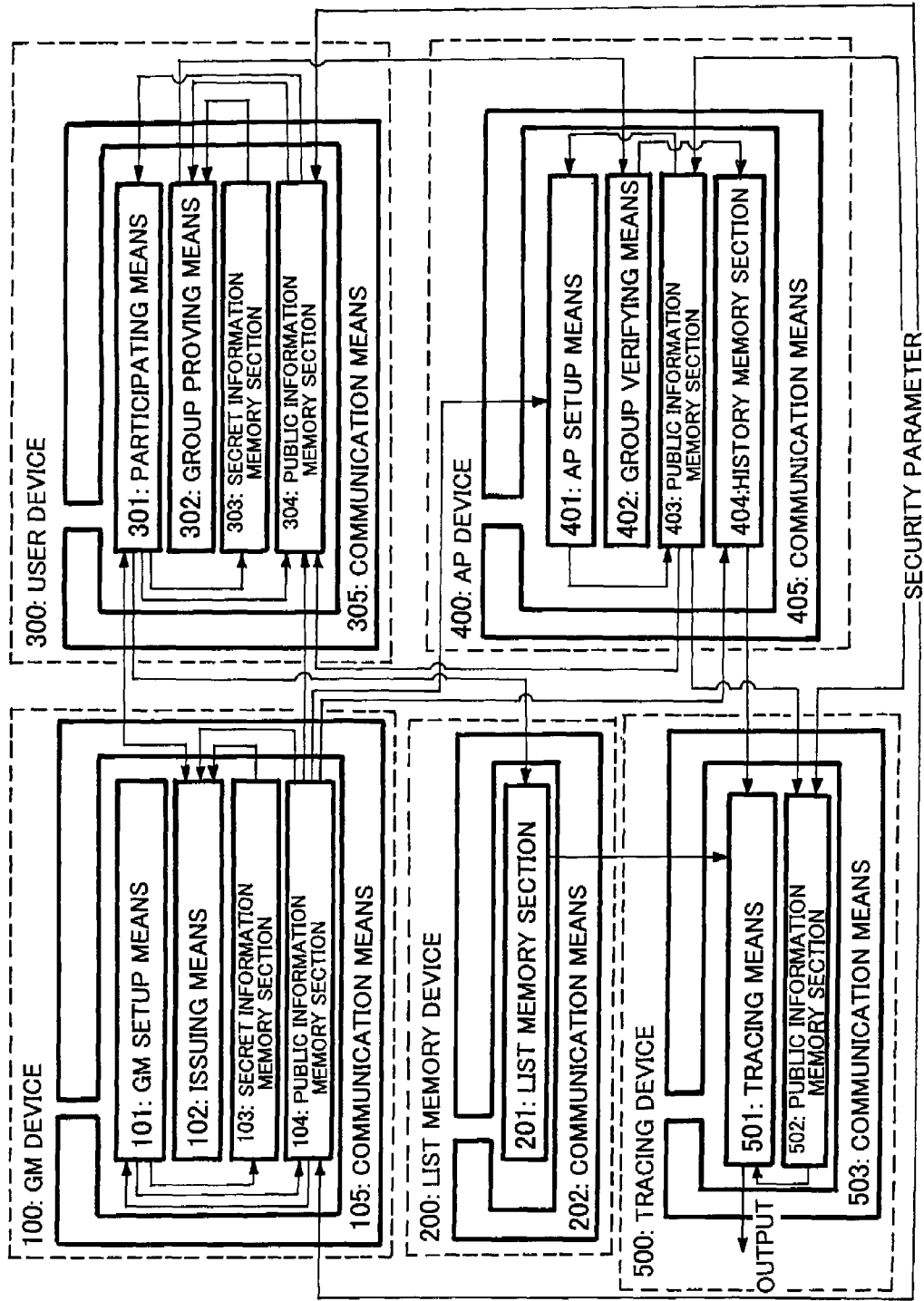
FIG. 1 is a schematic block diagram of the number-limited anonymous authentication system according to the present invention and used in Examples 5 and 6, illustrating the overall configuration thereof.

1: pseudo-random function calculating device
2: key for pseudo-random function creating means
3: secret key memory section
4: public key memory section
5: input means
6: pseudo-random function calculating means
7: output means
10: member identifying information generating device
11: secret key creating means
12: public information memory section
13: member identifying information generating means
14: communication device
15: write means
20: random number generating device
21: public information memory section
22: random number selecting means
23: communication means
30: tag creating device
31: public information memory section
32: tag creating means
33: input means
34: communication device
35: tag calculating means
40: member identifying information extracting device
41: public information memory section
42: member identifying information extracting means
43: agreement determining means
44: output means
45: communication device
50: key creating device
51: input means
52: public information memory section
53: key for tag creating means
54: communication means
100: GM device
101: GM setup means
102: issuing means
103: secret information memory section
104: public information memory section
105: communication means
200: list memory device
201: list memory section
202: communication means
300: user device
301: participating means
302: group proving means
303: secret information memory section
304: public information memory section
305: communication means
400: AP device
401: AP setup means
402: group verifying means
403: public information memory section
404: history memory section
405: communication means
500: tracing device
501: tracing means
502: public information memory section
503: communication means

BEST MODE FOR CARRYING OUT THE INVENTION

Now, the best mode for carrying out a pseudo-random function calculating device, a pseudo-random function calculating method, a number-limited anonymous authentication system and a number-limited anonymous authentication method according to the present invention will be described below by referring to the accompanying drawings.

EXAMPLE 1

This is an example of application of a pseudo-random function calculating device according to the present invention.

Figure 2:
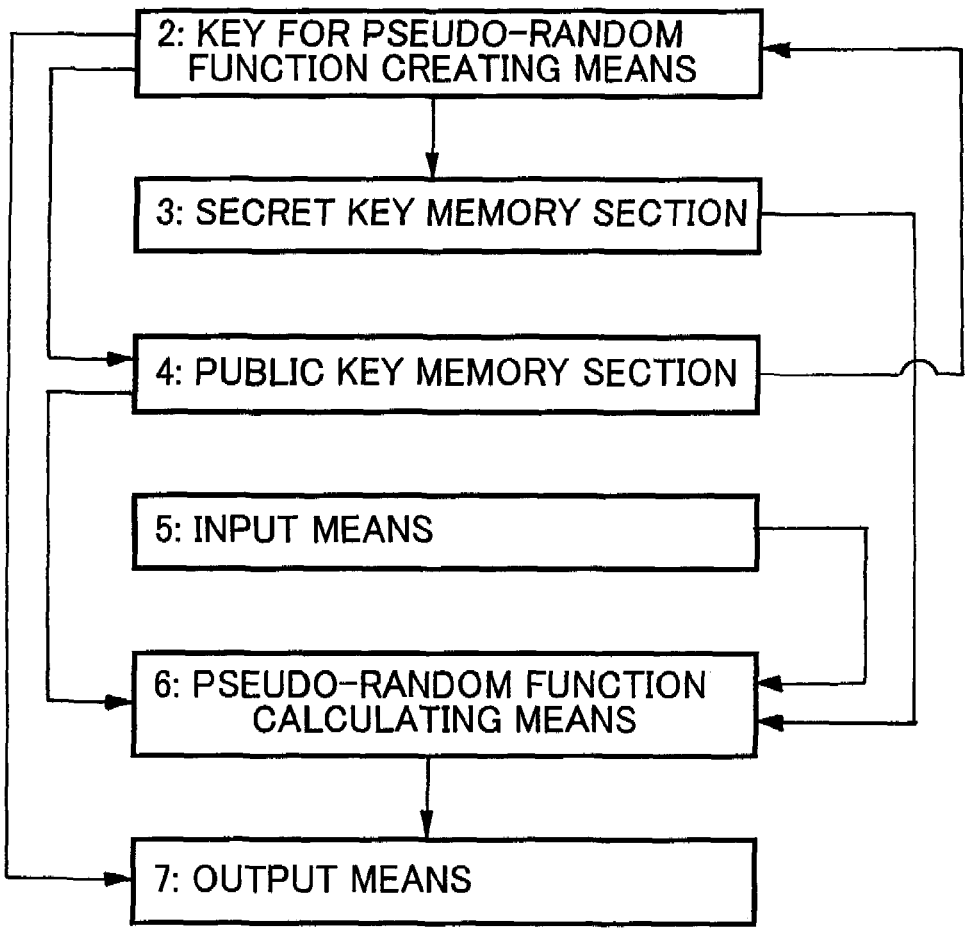
FIG. 2 is a schematic block diagram of the pseudo-random function calculating device according to the present invention and used in Example 1, illustrating the overall configuration thereof.

The configuration of the device of this example will be described below by referring to FIG. 2. The pseudo-random function calculating device 1 illustrated in FIG. 2 comprises as functional components thereof a key for pseudo-random function creating means 2, a secret key memory section 3, a public key memory section 4, an input means 5, a pseudo-random function calculating means 6 and an output means 7.

The pseudo-random function calculating device 1 can typically be realized by means of the CPU, a memory device and various input/output devices of a computer. In this example, the key for pseudo-random function creating means 2 and the pseudo-random function calculating means 6 are realized as the CPU of the computer executes commands of a computer program on the memory device. The computer program is defined in advance according to the processing algorithms (which will be described in greater detail herein after) of the means 2, 6. The secret key memory section 3 and the public key memory section 4 are installed in the memory device of the computer. Additionally, the input means 5 and the output means 7 correspond to the input/output devices of the computer.

In the following description, $\omega$ represents a security parameter and $G\_1$ represents an integer of order of $G\_1$ having $\omega$ bits in a finite cyclic group, while q represents the order of $G\_1$. It is assumed that the pseudo-random function calculating device 1 of this example acquires the parameter of $G\_1$, $\omega$ and q in advance by some means or other and the parameter of $G\_1$, $\omega$ and q are written in public key memory section 4. Any technique may be used to acquire the parameter of $G\_1$, $\omega$ and q. For example, they may be input from the outside or written in a circuit of the device as part of hardware.

Now, the process sequence of the key for pseudo-random function creating means 2 and the pseudo-random function calculating means 6 will be described below by referring to FIG. 3. The process sequence illustrated in FIG. 3 is realized as a computer program stored in the memory device of the computer and executed by the CPU of the computer.

Referring to FIG. 3, the key for pseudo-random function creating means 2 executes the following process. Firstly, it randomly selects elements g, h of $G\_1$ (Step S1). Then, it randomly selects element y of $Z\_q$ (Step S2). Then, it writes y and (g, h) respectively in the secret key memory section 3 and in the public key memory section 4 (Step S3). Finally, it outputs (g, h) (Step S4).

Referring to FIG. 3, the pseudo-random function calculating means 6 executes the following process. Firstly, it receives as input element i of $G\_1$ (Step S5). Then, it calculates $f(i)=g^{\{i\}} h^{\{1/(y+i)\}}$ (Step S6). Finally, it outputs f(i) (Step S7).

Thus, with this example, it is possible to calculate the function value of a pseudo-random function by means of a small number of times of calculations of reciprocals and a modular exponentiation to allow the use of a simple calculation algorithm for calculating a function value. Thus, it is possible to efficiently give a zero knowledge proof of knowledge of x that satisfies y=f(x).

EXAMPLE 2

This is an example of application of a pseudo-random function calculating device according to the present invention.

Figure 4:
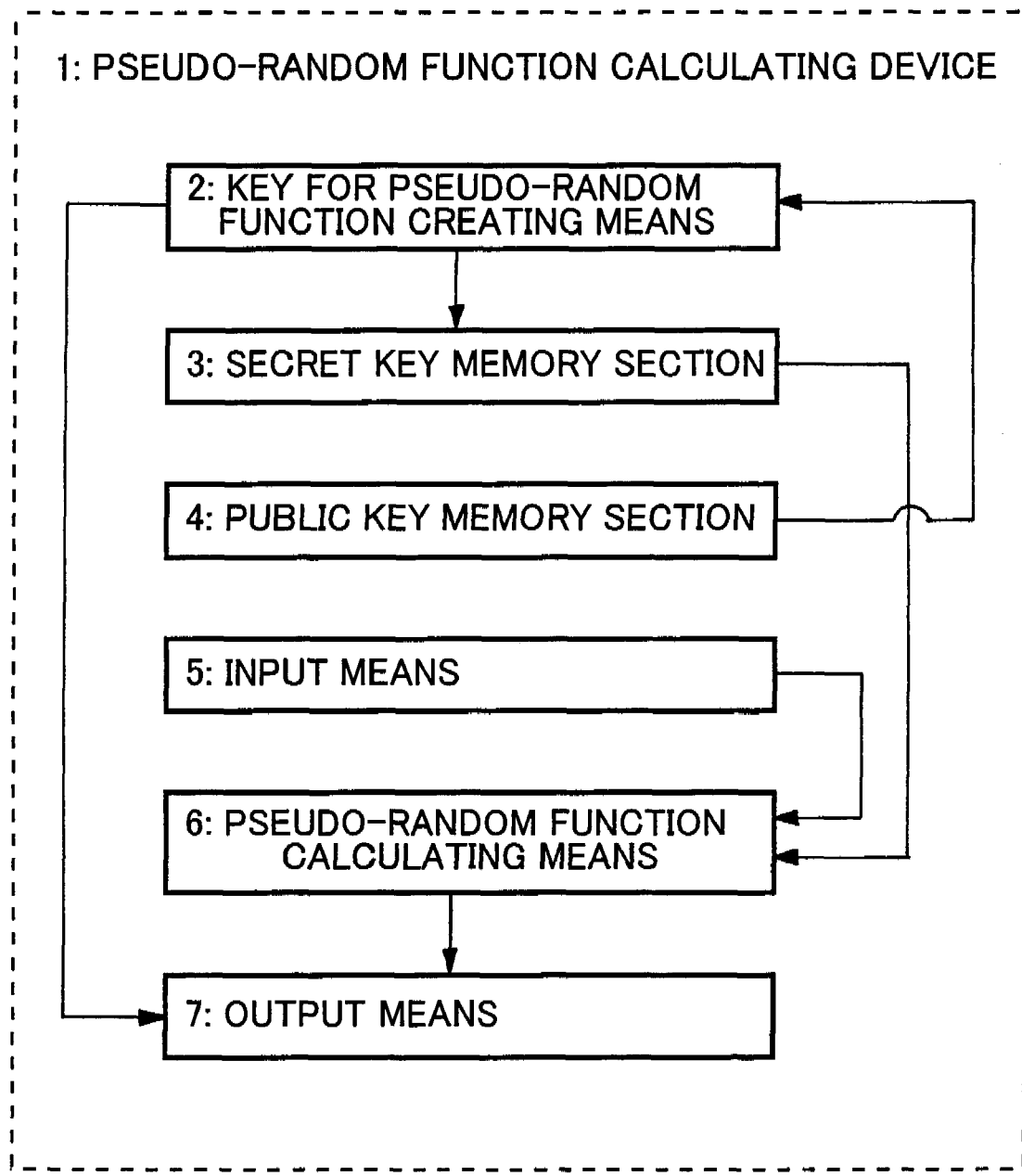
FIG. 4 is a schematic block diagram of the pseudo-random function calculating device according to the present invention and used in Example 2, illustrating the overall configuration thereof.

The configuration of the device of this example will be described below by referring to FIG. 4. The pseudo-random function calculating device 1 of this example illustrated in FIG. 4 comprises as functional components thereof a key for pseudo-random function creating means 2, a secret key memory section 3, a public key memory section 4, an input means 5, a pseudo-random function calculating means 6 and an output means 7.

The pseudo-random function calculating device 1 can typically be realized by means of the CPU, a memory device and various input/output devices of a computer. In this example, the key for pseudo-random function creating means 2 and the pseudo-random function calculating means 6 are realized as the CPU of the computer executes commands of a computer program on the memory device. The computer program is defined in advance according to the processing algorithms (which will be described in greater detail herein after) of the means 2, 6. The secret key memory section 3 and the public key memory section 4 are installed in the memory device of the computer. Additionally, the input means 5 and the output means 7 correspond to the input/output devices of the computer.

In the following description, $\omega$ represents a security parameter and $G\_1$ represents an integer of order of $G\_1$ having $\omega$ bits in a finite cyclic group, while q represents the order of $G\_1$. It is assumed that the pseudo-random function calculating device of this example acquires the parameter of $G\_1$, $\omega$ and q in advance by some means or other and the parameter of $G\_1$, $\omega$ and q are written in public key memory section 4. Any technique may be used to acquire the parameter of $G\_1$, $\omega$ and q. For example, they may be input from the outside or written in a circuit of the device as part of hardware.

Now, the process sequence of the key for pseudo-random function creating means 2 will be described below by referring to FIG. 5. The process sequence illustrated in FIG. 5 is realized as a computer program stored in the memory device of the computer and executed by the CPU of the computer.

Referring to FIG. 5, the key for pseudo-random function creating means 2 randomly selects element y of $Z\_q$ (Step S11) and then writes y in the secret key memory section 3 (Step S12).

Referring FIG. 5, the pseudo-random function calculating means 6 executes the following process.

Firstly, it receives as input bit string X and element i of $G\_1$ (Step S13).

Then, it calculates $(g\_\{X\}, h\_\{x\})=H\_\{G\_1^2\}(X)$ (Step S14). Note that $H\_\{G\_1^2\}$ indicates a hash function that takes a value at $G\_1^2$.

Then, it calculates $f[y]\_\{\omega\}(i, X)=g\_(X)^{\wedge}(i)h\_\{X\}^{\wedge}\{1/(y+i)\}$ (Step S15).

Finally, it outputs $f[y]\_\{\omega\}(i, X)$ (Step S16).

Thus, with this example again, like with Example 1, it is possible to calculate the function value of a pseudo-random function by means of a small number of times of calculations of reciprocals and a modular exponentiation to allow the use of a simple calculation algorithm for calculating a function value. Thus, it is possible to efficiently give a zero knowledge proof of knowledge of x that satisfies y=f(x).

EXAMPLE 3

This is an example of application of a member of times limiting anonymous authentication system using a pseudo-random function calculating device according to the present invention.

The configuration of the system and that of the device of this example will be described below by referring to FIG. 6. The system illustrated in FIG. 6 comprises as functional components thereof a member identifying information generating device 10, a random number generating device 20, a tag creating device 30, a member identifying information extracting device 40 and a key creating device 50. The tag creating device 30 employs a pseudo-random function calculating device.

The member identifying information generating device 10 by turn comprises as functional components thereof a secret key creating means 11, a public key information memory section 12, a member identifying information generating means 13, a write means 14 and a communication means 15.

The random number generating device 20 comprises as functional components thereof a public information memory section 21, a random number selecting means 22 and a communication means 23.

The tag creating device 30 employs a pseudo-random function calculating device as described above and comprises as functional components thereof a public information memory section 31, a tag calculating means 32, an input means 33 and a communication device 34.

The member identifying information extracting device 40 comprises as functional components thereof a public information memory section 41, a member identifying information extracting means 42, an agreement determining means 43, an output means 44 and a communication device 45.

The key creating device 50 comprises as functional components thereof an input means 51, a public information memory section 52, a key for tag creating means 53 and a communication means 54.

The devices 10 through 50 can typically be realized by means of the CPU, a memory device, a network interface section and various input/output devices of a computer. In this example, each of the means 11, 13, 14, 22, 32, 42, 43, 53 is realized as the CPU of the computer executes commands of a computer program on the memory device. The computer program is defined in advance according to the processing algorithms (which will be described in greater detail herein after) of the means. The public information memory sections 12, 21, 31, 41, 52 are installed in the memory devices of the computers. The communication means 15, 23, 54 and the communication devices 34, 45 correspond to the interface network sections of the computers, while the input means 23, 51 and the output means 44 correspond to the input/output devices of the computers.

Figure 6:
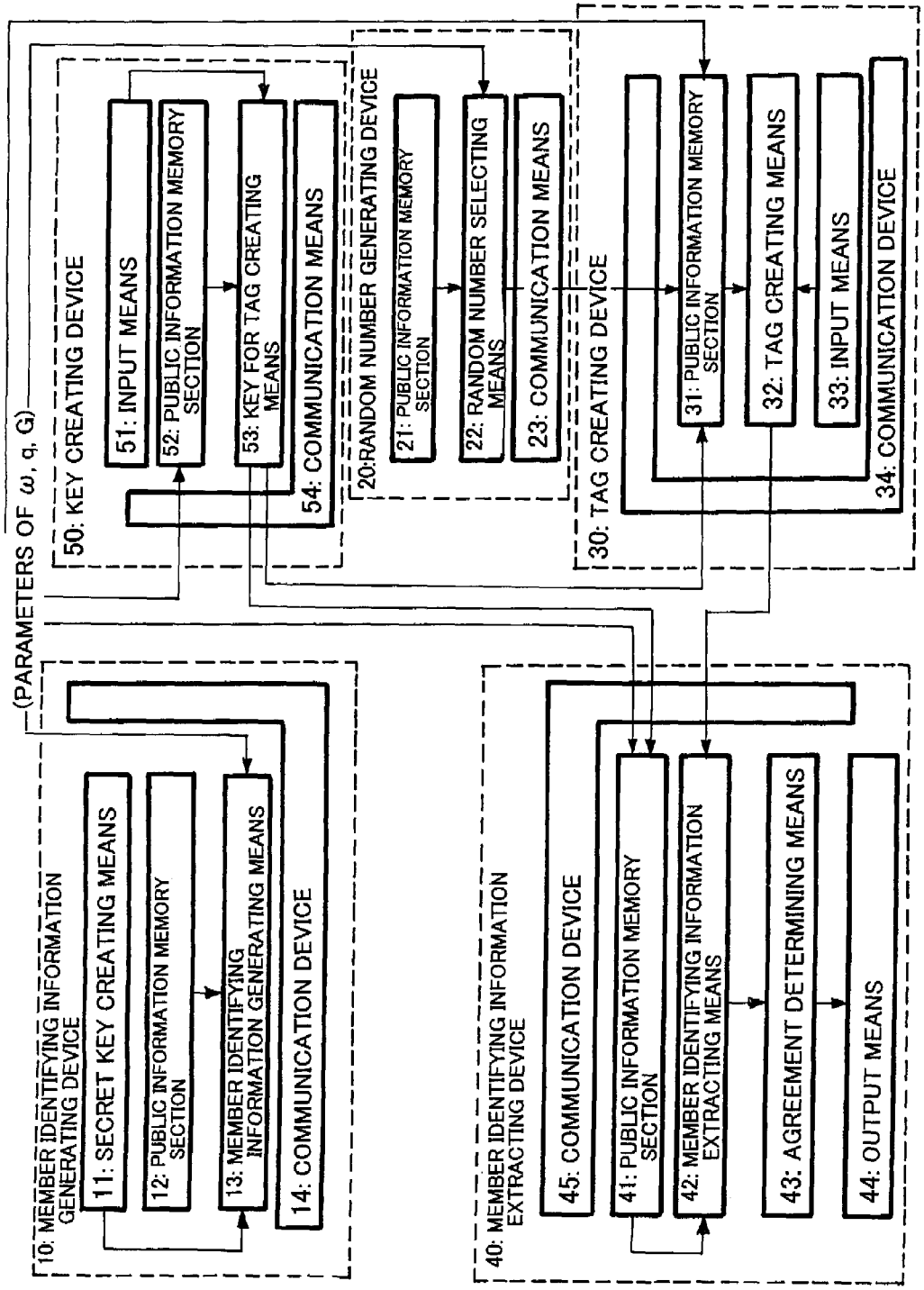
FIG. 6 is a schematic block diagram of the number-limited anonymous authentication system according to the present invention and used in Example 3, illustrating the overall configuration thereof.

While five devices 10 through 50 of five different types are provided in FIG. 6 as the simplest arrangement, two or more than two devices of each type may be provided. While the devices through 50 are different machines in the instance of FIG. 6, a single machine may be adapted to operate as devices of two different types.

The member identifying information generating device 10, the random number generating device 20, the tag creating device 30, the member identifying information extracting device 40 and the key creating device 50 can communicate with each other by means of the related respective communication means 14, 23, 34, 45, 54. Any communication media may be used for the purpose of the present invention. Communication media that can be used for the purpose of the present invention include the Internet, electric waves and telephone lines.

The devices 10 through 50 can acquire public information that other devices publicize by some means or other. Any means for acquiring public information may be used. For example, any of the devices 10 through 50 can directly acquire a specific piece of public information from the device that publicizes the information. Alternatively, it can receive from the server having a list of pieces of public information by way of the related communication means.

Now, the operation of the system of this example will be described by referring to FIGS. 7 and 8. The process sequence illustrated in FIGS. 7 and 8 is realized as a computer program stored in the memory device of the computer and executed by the CPUs of the computers.

In the following description, $\omega$ represents a security parameter and $G\_1$ represents an integer of order of $G\_1$ having $\omega$ bits in a finite cyclic group, while q represents the order of $G\_1$. It is assumed that the pseudo-random function calculating device of this example acquires the parameter of $G\_1$, $\omega$ and q in advance by some means or other and the parameter of $G\_1$, $\omega$ and q are written in public information memory sections 12, 21, 31, 41, 52 of all the devices 10 through 50. Any technique may be used to acquire the parameter of $G\_1$, $\omega$ and q. For example, they may be input from the outside or written in a circuit of the device as part of hardware. Each of the devices 10 through 50 reads in these data whenever necessary.

Figure 7:
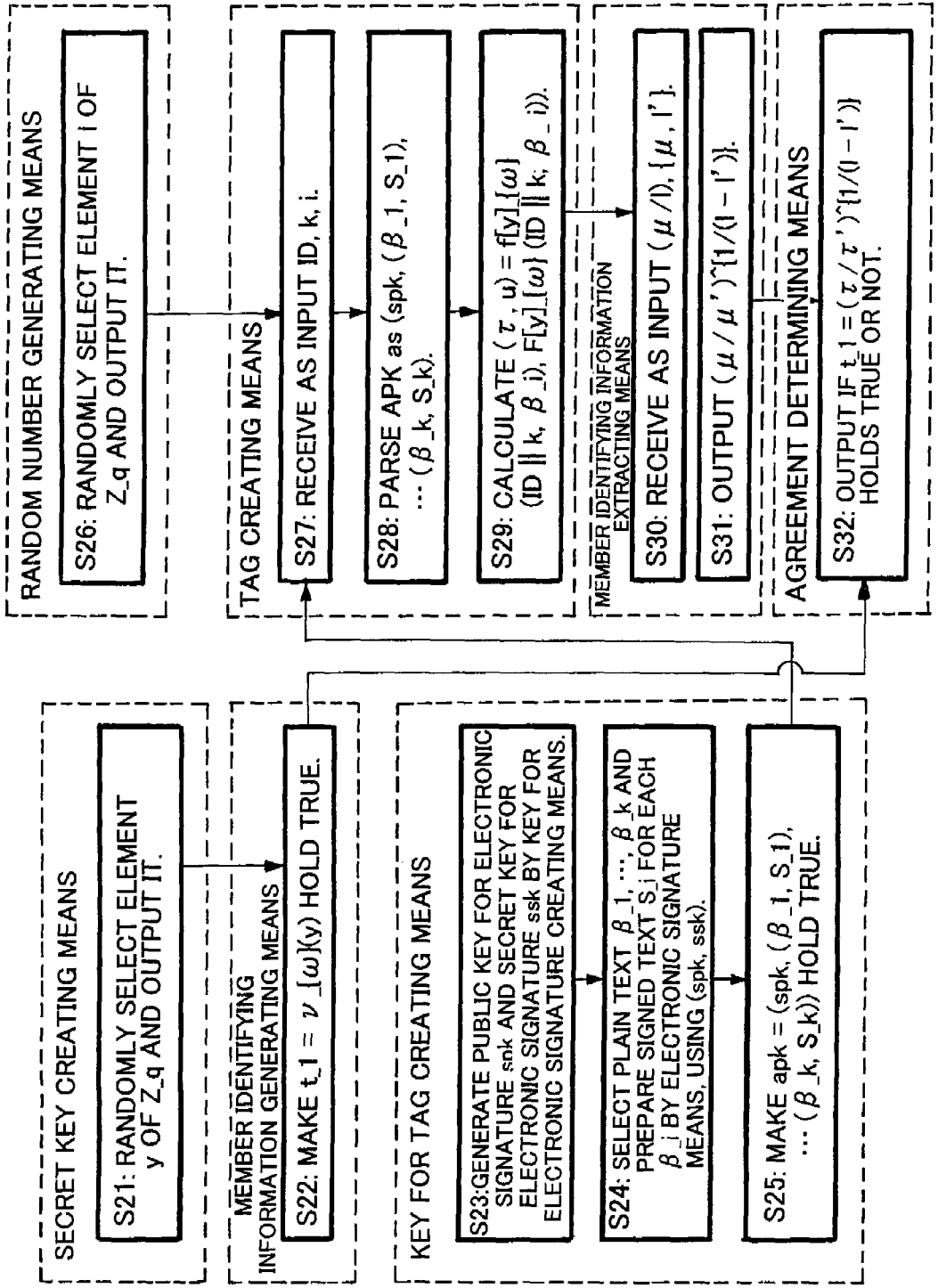
FIG. 7 is a flowchart illustrating the process sequence of the means of the number-limited anonymous authentication system of FIG. 6 (Example 3)

Referring to FIG. 7, firstly the member identifying information generating device 10 executes the process of the secret key creating means 11 and randomly selects element y of $Z\_q$ (Step S21). Assume that $g\_1$ is element of $G\_1$ and $v\_\{\omega\}(y)=g\_1^\{y\}$. Also assume that $g\_1$ is selected in advance by some means or other and stored in the public information memory sections 12, 21, 31, 41, 52 of all the devices 10 through 50. While any technique may be used to select $g\_1$ and distribute to the devices 10 through 50, it is desirable to set $g\_1$ to some Hash value from a safety point of view.

Then, the member identifying information generating device 10 executes the process of the member identifying information extracting means 42 to make $t\_1=v\_\{\omega\}(y)$ hold true (Step S22).

Assume that $G\_2$, $H\_2$, $G\_3$ represent a finite cyclic group of order of q and $<\bullet, \bullet>$ is a map that makes element (g, h') of $G\_3$ corresponds to element (g, h') of $G\_2 \times H\_2$ and $<g^x, h'^y>=<g, h'>^\{xy\}$ holds true for any g, h', x, y. Many techniques are known for generating such a set of ($G\_2$, $H\_2$, $G\_3$, $<\bullet, \bullet>$) and calculating $<\bullet, \bullet>$ and any of such techniques may be used for the purpose of the present invention (see, inter alia, Non-Patent Document 2).

Then, the key creating device 50 executes the process of the key for tag creating means 53.

Since the key for tag creating means 53 executes the process of the key for electronic signature creating means and that of the electronic signature means respectively in Steps S23 and S24, the process of the key for electronic signature creating means and that of the electronic signature means will be described by referring to FIG. 8 before describing the process of the key for tag creating means 53.

Referring to FIG. 8, at first, the key for electronic signature creating means randomly selects element $g\_2$ of $G\_2$ (Step S41). Then, it randomly selects element $g'\_2$ of $H\_2$ (Step S42). Thereafter, it randomly selects element ssk of $Z\_q$ (Step S43).

Then, it calculates $h'\_2=g'\_2^\{ssk\}$ (Step S44).

Finally, it sets ($g\_2$, $g'\_2$, $h'\_2$) as public key for electronic signature spk (Step S45).

The electronic signature means firstly parses spk as ($g\_2$, $g'\_2$, $h'\_2$) (Step S46). Then, it calculates signed text $S=g\_2^\{1/(ssk+\beta)\}$ for plain text $\beta$ (Step S47).

Upon receiving non-negative integer k, the key creating device 50 executes the process of the key for tag creating means 53 as illustrated in FIG. 7.

Referring to FIG. 7, the key creating device 50 executes the pseudo-random of the key for electronic signature creating means and generates public key for electronic signature spk and secret key for electronic signature ssk (Step S23).

Then, the key creating device 50 selects plain text $\beta\_1, \ldots, \beta\_k$ and executes the process of the electronic signature means using (spk, ssk) to prepare signed text $S\_i$ for each $\beta\_i$ (Step S24).

Finally, the key creating device 50 makes apk=(spk, ($\beta\_1$, $S\_1$), \ldots, ($\beta\_k$, $S\_k$)) hold true (Step S25).

Then, the random number generating device 20 executes the process of the random number selecting means 21 and randomly selects element 1 of $Z\_q$, which the random member generating device 20 then outputs (Step S26).

Thereafter, the tag creating means 30 communicates with the random number generating device 20 by means of the communication means 23, 34 to receive l. Then, it communicates with the key creating device 50 by means of the communication devices 54, 34 to receive apk and starts the process of the tag creating means 32. The process of the tag creating means 32 will now be described below.

Firstly, the tag creating device 30 receives the ID of the tag creating device 30 by the process of the tag creating means 32, the upper limit value k by the number of which the tag creating device 32 allows access and the current number of times of access i ($i \leq k$) as a result of the process thereof (Step S27).

Then, the tag creating device 30 parses apk as (spk, ($\beta\_1$, $S\_1$), ..., ($\beta\_k$, $S\_k$)) (Step S28).

Then, the tag creating device 30 takes $f[y]\_\{\omega\}$ as the pseudo-random function of Example 2 and makes $F[y]\_\{\omega\}$ (X, i)=$f[y]\_\{\omega\}$(X, −i) hold true.

Finally, the tag creating device 30 calculates ($\tau$, u)= $f[y]\_\{\omega\}$ (ID∥k, $\beta\_i$), $F[y]\_\{\omega\}$ (ID∥k, $\beta\_i$)) Step S29). It calculates $f[y]\_\{\omega\}$ and $F[y]\{\omega\}$ by executing the process of the pseudo-random function calculating means 6 of Example 2.

Assume that the process of the tag creating means 32 is executed twice by using the same input (ID, k, i). Assume that the outputs of the tag creating means 32 are ($\tau$, $\mu$, l) and ($\tau$, $\mu'$, l').

Then, the member identifying information extracting device 40 receives ($\mu$, l) and ($\mu'$, l') from the tag creating device 30 by means of the communication means 34, 45 and sequentially executes the processes of the agreement determining means 43 with the member identifying information extracting means 42.

The member identifying information extracting device 40 executes the process of the member identifying information extracting means 42 and calculates $(\mu/\mu')^{\{1/(l-l')\}}$ (Steps S30, S31).

The member identifying information extracting device 40 executes the process of the agreement determining means 43 and, as it receives $t\_1$ and $(\mu/\mu')^{\{1/(l-l')\}}$ as input, it outputs if $t\_1=(\tau/\tau')^{\{1/(l-l')\}}$ holds true or not (Step S32).

Thus, with this example, since the number of data that the user needs to calculate is O(log k) unlike the known number-limited anonymous authentication techniques, the quantity of calculation on the part of the user is not proportional to the limited number of times k and hence it is possible to realize an efficient number-limited anonymous authentication system.

EXAMPLE 4

This is an example of application of a member of times limiting anonymous authentication system using the pseudo-random function calculating device described above.

The configuration of the system and that of the device of this example will be described below by referring to FIG. 9. The system illustrated in FIG. 9 comprises as functional components thereof a member identifying information generating device 10, a random number generating device 20, a tag creating device 30 and a member identifying information extracting device 40. The tag creating device 30 employs the pseudo-random function calculating device described above.

The member identifying information generating device 10 by turn comprises as functional components thereof a secret key creating means 11, a public information memory section 12, a member identifying information generating means 13, a communication means 14 and a write means 15.

The random number generating device 20 comprises as functional components thereof a public information memory section 21, a random number selecting means 22 and a communication means 23.

The tag creating device 30 employs a pseudo-random function calculating device as described above and comprises as functional components thereof a public information memory section 31, an input means 33, a communication device 34 and a tag calculating means 35.

The member identifying information extracting device 40 comprises as functional components thereof a public information memory section 41, a member identifying information extracting means 42, an agreement determining means 43, an output means 44 and a communication device 45.

The devices 10 through 50 can typically be realized by means of the CPU, a memory device, a network interface section and various input/output devices of a computer. In this example, each of the means 11, 13, 14, 22, 42, 43, 53 is realized as the CPU of the computer executes commands of a computer program on the memory device. The computer program is defined in advance according to the processing algorithms (which will be described in greater detail herein after) of the means. The public information memory sections 12, 21, 31, 41, 52 are installed in the memory devices of the computers. The communication means 15, 23, 54 and the communication devices 34, 45 correspond to the network interface sections of the computers, while the input means 23, 51 and the output means 44 correspond to the input/output devices of the computers.

Figure 9:
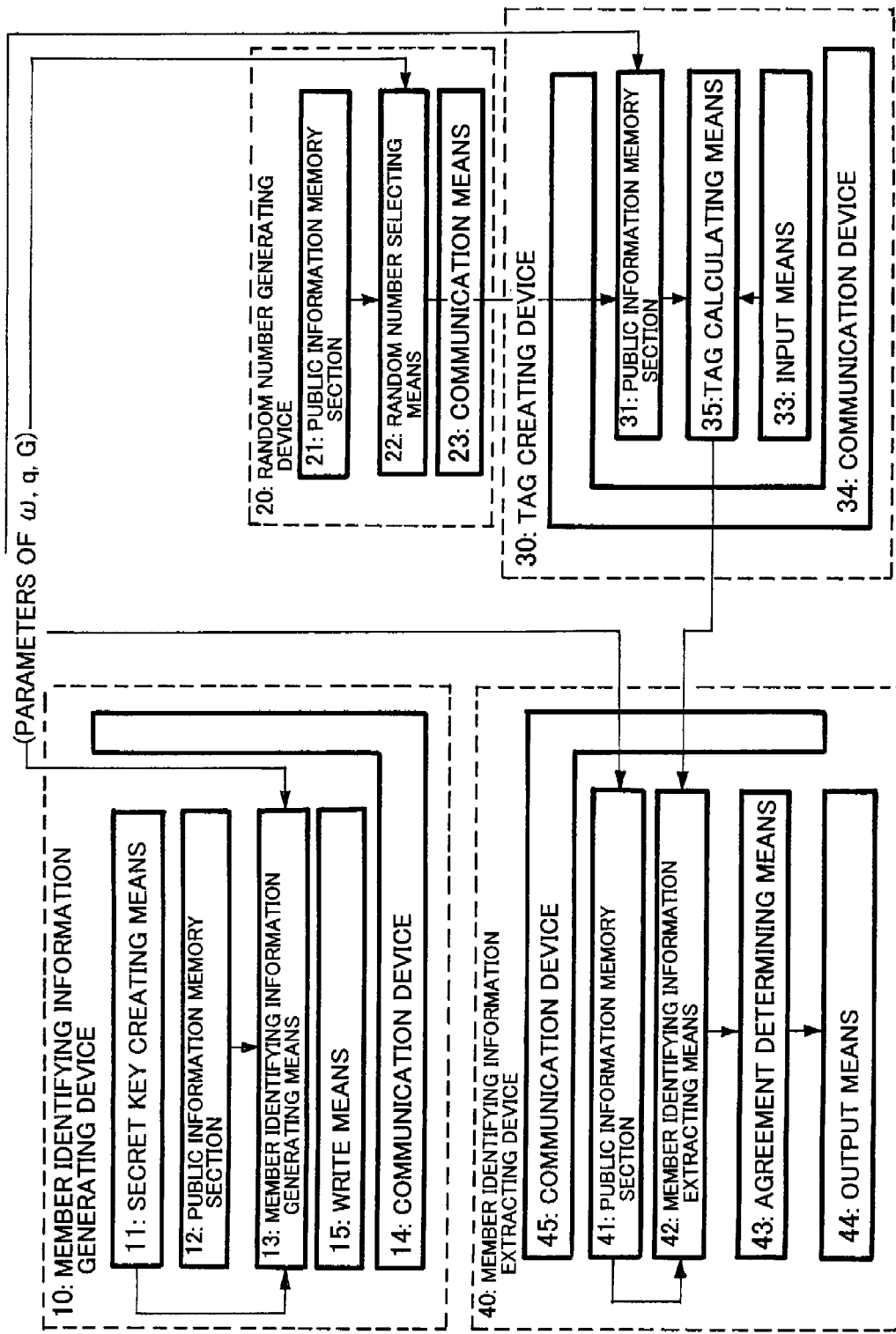
FIG. 9 is a schematic block diagram of the number-limited anonymous authentication system according to the present invention and used in Example 4, illustrating the overall configuration thereof.

While five devices 10 through 50 of five different types are provided in FIG. 9 as the simplest arrangement, two or more than two devices of each type may be provided. While the devices 10 through 50 are different machines in the instance of FIG. 9, a single machine may be adapted to operate as devices of two different types.

The member identifying information generating device 10, the random number generating device 20, the tag creating device 30 and the member identifying information extracting device 40 can communicate with each other by means of the related respective communication means 14, 23, 34, 45. Any communication media may be used for the purpose of the present invention. Communication media that can be used for the purpose of the present invention include the Internet, electric waves and telephone lines.

The devices 10 through 40 can acquire public information that other devices publicize by some means or other. Any means for acquiring public information may be used. For example, any of the devices 10 through 40 can directly acquire a specific piece of public information from the device that publicizes the information. Alternatively, it can receive from the server having a list of pieces of public information by way of the related communication means.

The member identifying information generating device 10, the random number generating device 20 and the member identifying information extracting device 40 of Example 4 respectively operate same as the member identifying information generating device 10, the random number generating device 20 and the member identifying information extracting device 40 of above-described Example 3.

The communication device 34, the public information memory section 31 and the input means 33 of the tag creating device 30 of Example 4 have respective functional features same as the communication device 34, the public information memory section 31 and the input means 33 of the tag creating device 30 of above-described Example 3.

Now, a tag calculating means 35 of the Example 4 will be described by referring to FIG. 10. The process sequence illustrated in FIG. 10 is realized as a computer program stored in the memory device of the computer and executed by the CPUs of the computers.

In the following description, $\omega$ represents a security parameter and $G\_1$ represents an integer of order of $G\_1$ having $\omega$ bits in a finite cyclic group, while q represents the order of $G\_1$. It is assumed that the pseudo-random function calculating device acquires the parameter of $G\_1$, $\omega$ and q in advance by some means or other and the parameter of $G\_1$, $\omega$ and q are written in public information memory sections of all the devices. Any technique may be used to acquire the parameter of $G\_1$, $\omega$ and q. For example, they may be input from the outside or written in a circuit of the device as part of hardware. Each of the devices 10 through 50 reads in these data whenever necessary.

Figure 10:
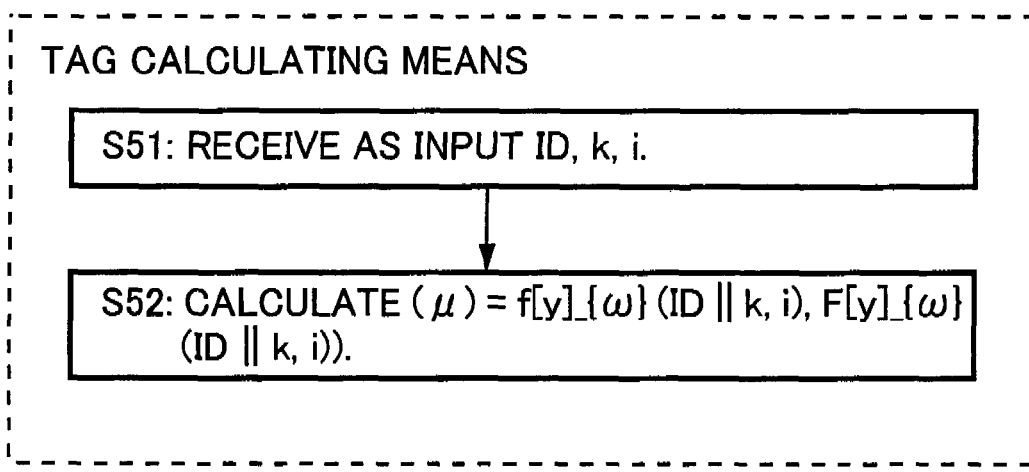
FIG. 10 is a flowchart illustrating the process sequence of the tag calculating means of FIG. 9 (Example 4)

Referring to FIG. 10, the tag creating device 3 executes the process of the tag calculating means 35 and receives the ID of the tag creating device, the upper limit value k by the number of which the tag creating device allows access and the current number of times of access i ($i \leq k$) (Step S51).

Then, the tag creating device 30 takes $f[y]\_\{\omega\}$ as the pseudo-random function of Example 2 and makes $F[y]\_\{\omega\}(X, i) = f[y]\_\{\omega\}(X, -i)$ hold true.

Finally, the tag creating device 3 calculates $(\tau, u) = f[y]\_\{\omega\}(ID \| k, i), F[y]\_\{\omega\}(ID\ k, i))$ (Step S52).

It calculates $f[y]\_\{\omega\}$ and $F[y]\_\{\omega\}$ by executing the pseudo-random function calculating process BPRF5 of Example 2.

Thus, with this example, like above-described Example 3, since the number of data that the user needs to calculate is $O(\log k)$ unlike the known number-limited anonymous authentication techniques, the quantity of calculation on the part of the user is not proportional to the limited number of times k at the time of authentication and hence it is possible to realize an efficient number-limited anonymous authentication system.

EXAMPLE 5

This is an example of application of a member of times limiting anonymous authentication system using the pseudo-random function calculating device described above.

The configuration of the system and that of the device of this example will be described below by referring to FIG. 1.

The member of times limiting anonymous authentication system illustrated in FIG. 1 is formed by adding various calculating sequences to the above-described systems of Examples 3 and 4. It comprises as functional components thereof five devices including a GM (group manager) device (group managing device) 100, a list memory device 200, a user device 300, an AP (application provider) device 400 and a tracing device 500. The above-described pseudo-random function calculating device is applied to the group signature means (group proving means, group verifying means), which will be described in greater detail herein after.

The GM device 100 comprises as functional components thereof a GM setup means 101, an issuing means 102, a secret information memory section 103, a public information memory section 104 and a communication means 105.

The list memory device 200 comprises as functional components thereof a list memory section 201 and a communication section 202.

The user device 300 comprises as functional components thereof a participating means 301, a group proving means 302, a secret information memory section 303, a public information memory section 304 and a communication means 305.

The AP device 400 comprises as functional components thereof an AP setup means 401, a group verifying means 402, a public information memory section 403, a history memory section 404 and a communication means 405.

The tracing device 500 comprises as functional components thereof a tracing means 501, a public information memory section 502 and a communication means 503.

The devices 100 through 500 can typically be realized by means of the CPU (of a server machine, a client machine or the like), a memory device, a network interface section and various input/output devices of a computer. In this example, each of the means 101, 102, 301, 302, 401, 402, 501 is realized as the CPU of the computer executes commands of a computer program on the memory device. The computer program is defined in advance according to the processing algorithms (which will be described in greater detail herein after) of the means. The public information memory sections 104, 304, 403, 502, the secret information memory sections 103, 303, the list memory section 201 and the history memory section 404 are installed in the memory devices of the computers. The communication means 105, 202, 305, 405, 503 correspond to the network interface sections of the computers.

While five devices of five different types are provided in FIG. 1 as the simplest arrangement, two or more than two devices of each type may be provided. While the devices 100 through 500 are different machines in the instance of FIG. 1, a single machine may be adapted to operate as devices of two different types. For example, a machine having the functional feature of the GM device 100 and that of the list memory device 200 may be used.

The GM device 100, the list memory device 200, the user device 300, the AP device 400 and the tracing device 500 can communicate with each other by means of the related respective communication means 105, 202, 305, 405, 503. While communication media that can be used for the purpose of the present invention include the Internet, electric waves and telephone lines, any communication media may be used for the purpose of the present invention.

Each of the GM device 100, the user device 300, the AP device 400 and the tracing device 500 store the public information it publicizes and also the public information the other devices publicize in the public information memory section 104, 304, 403 or 502, which ever appropriate. The list memory device 200 has a list memory section 201 as part thereof for storing public information. The list memory device 200 stores the public information it publicizes and also the public information the other device publicizes in the list memory section 201.

The devices 100 through 500 can acquire public information that other devices publicize by some means or other. Any means for acquiring public information may be used. For example, any of the devices 10 through 50 can directly acquire a specific piece of public information from the device that publicizes the information. Alternatively, it can receive from the server having a list of pieces of public information by way of the related communication means.

The GM device 100 and the user device 300 store secret information respectively in the secret information memory sections 103, 303.

Security parameter $\omega$ is distributed to the devices 100 through 500 in advance. Any appropriate technique can be used to distribute the security parameter. Similarly, any appropriate technique can be used to determine the security parameter.

Specific IDs are assigned respectively to the user device 300 and the AP device 400 and the devices 100 through 500 know in advance the IDs of all the user devices 300 and that of the AP device 400. Any data may be used as ID and any technique may be used to distribute the IDs. For example, the name of the propriety of the device, the IP address assigned to the device, the MAC address assigned to the device or a random number may be used as ID of the device.

The GM device 100 executes the process of the key for issuer creating means by means of the GM setup means 101. Now, the process of the GM setup means 101 will be described below and subsequently the key for issuer creating means will be described in detail.

Now, the operation of this example will be described by referring to FIGS. 11 through 21. The process sequence illustrated in FIGS. 11 through 21 is realized as a computer program stored in the memory device of the computer and executed by the CPUs of the computers.

Firstly, the process of the GM setup means 101 will be described by referring to FIG. 11.

Figure 11:
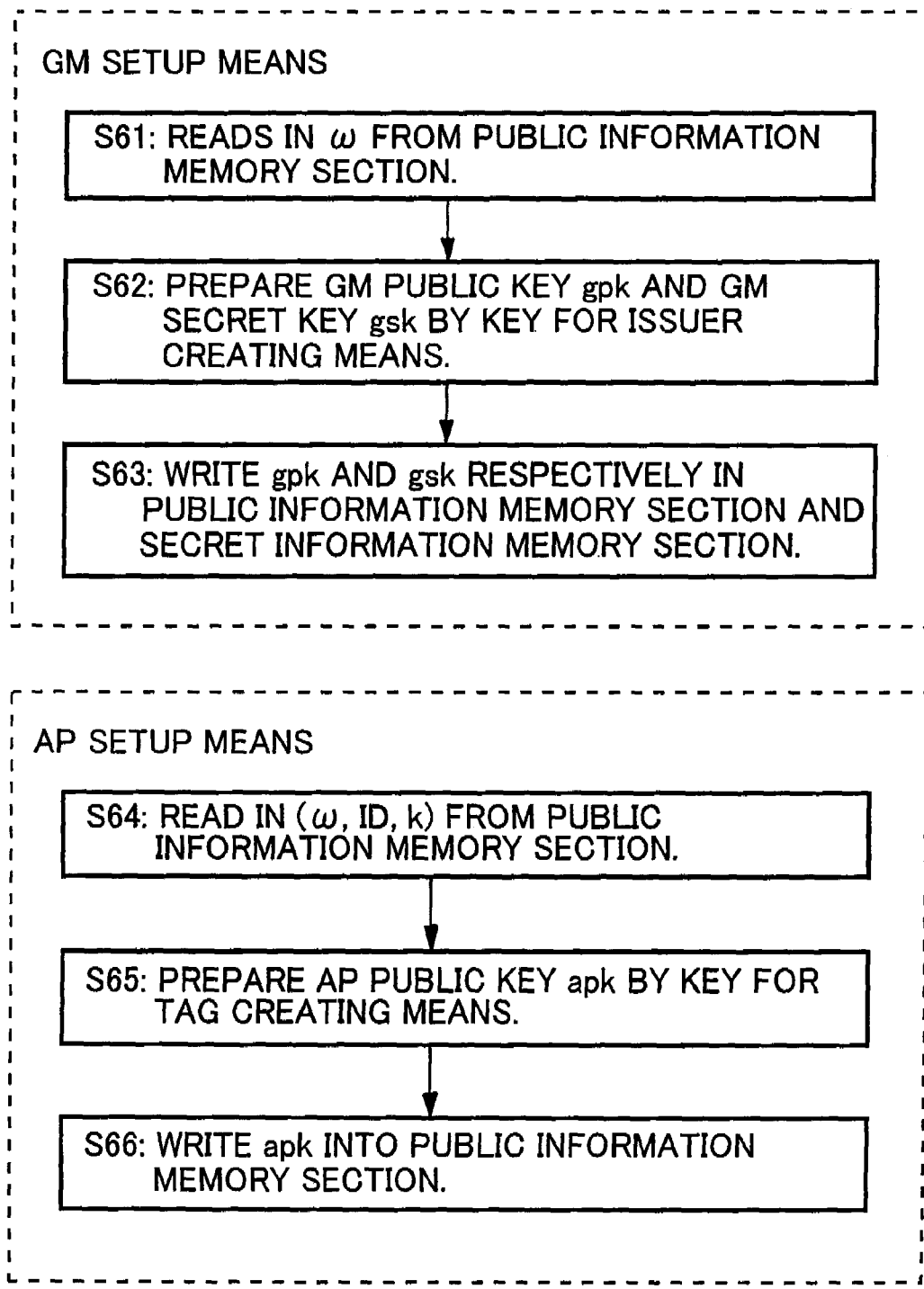
FIG. 11 is a flowchart illustrating the process sequence of the GM setup means and the AP setup means of FIG. 1 (Example 5)

Referring to FIG. 11, the GM device 100 reads in the security parameter ω from the public information memory section 104 (Step S61). The GM device 100 then executes the process of the key for issuer creating means to prepare GM public key gpk and GM secret key gsk (Step S62) and stores the gpk and the gsk respectively in the public information memory section 104 and the secret information memory section 103 (Step S63).

Now, the process of the key for issuer creating means will be described by referring to FIG. 16.

In the following description, it is assumed that $G\_2, H\_2, G\_3$ represent a finite cyclic group and $<\bullet, \bullet>$ is a map that makes element $<g, h'>$ of $G\_3$ corresponds to element $(g, h')$ of $G\_2 \times H\_2$ and $<g^x, h'^y>=cg, h'>^{\{xy\}}$ holds true for any $g, h', x, y$. Many techniques are known for generating such a set of $(G\_2, H\_2, G\_3, <\bullet, \bullet>)$ and calculating $<\bullet, \bullet>$ and any of such techniques may be used for the purpose of the present invention. See, inter alia, Non-Patent Document 2. It is also assumed that q represents the order of $G\_2$ and the quotient ring obtained by dividing integer ring Z by ideal qZ is expressed as $Z\_q$.

Referring to FIG. 16, the GM device 100 randomly selects elements $g\_3, h\_3, a\_3$ of $G\_2$ and element $g'\_3$ of $H\_2$ (Steps S131, S132). Then, the GM device 1 randomly selects element gsk of $Z\_q$ (Step S133). Thereafter, the GM device 1 calculates $u'\_3=g\_3^{\{ssk\}}$ (Step S134). Finally, the GM device 1 sets $(g\_3, h\_3, a\_3, g'\_3, u'\_3)$ as public key for issuer gpk (Step S135).

Now, the process of the issuing means 102 of the GM device 100 and that of the participating means 302 of the user device 300 will be described below.

The GM device 100 and the user device 300 execute the process of the issuing means 102 and that of the participating means 302 mutually communicating with each other.

The GM device 100 executes the processes of the first issuing means and the second issuing means by way of the issuing means 102. The user device 300 executes the processes of the first participating means, the phi calculating means, the member identifying information generating means, the second participating means and the member key verifying means by way of the participating means 302.

Firstly, the issuing means 102 and the participating means 302 will be described and subsequently the first issuing means, the first participating means, the phi calculating means, the member identifying information generating means, the second issuing means the second participating means and the member key verifying means will be described in detail.

Firstly, the process of the issuing means 102 of the GM device 100 and that of the participating means 302 of the user device 300 will be described below by referring to FIG. 12.

Figure 12:
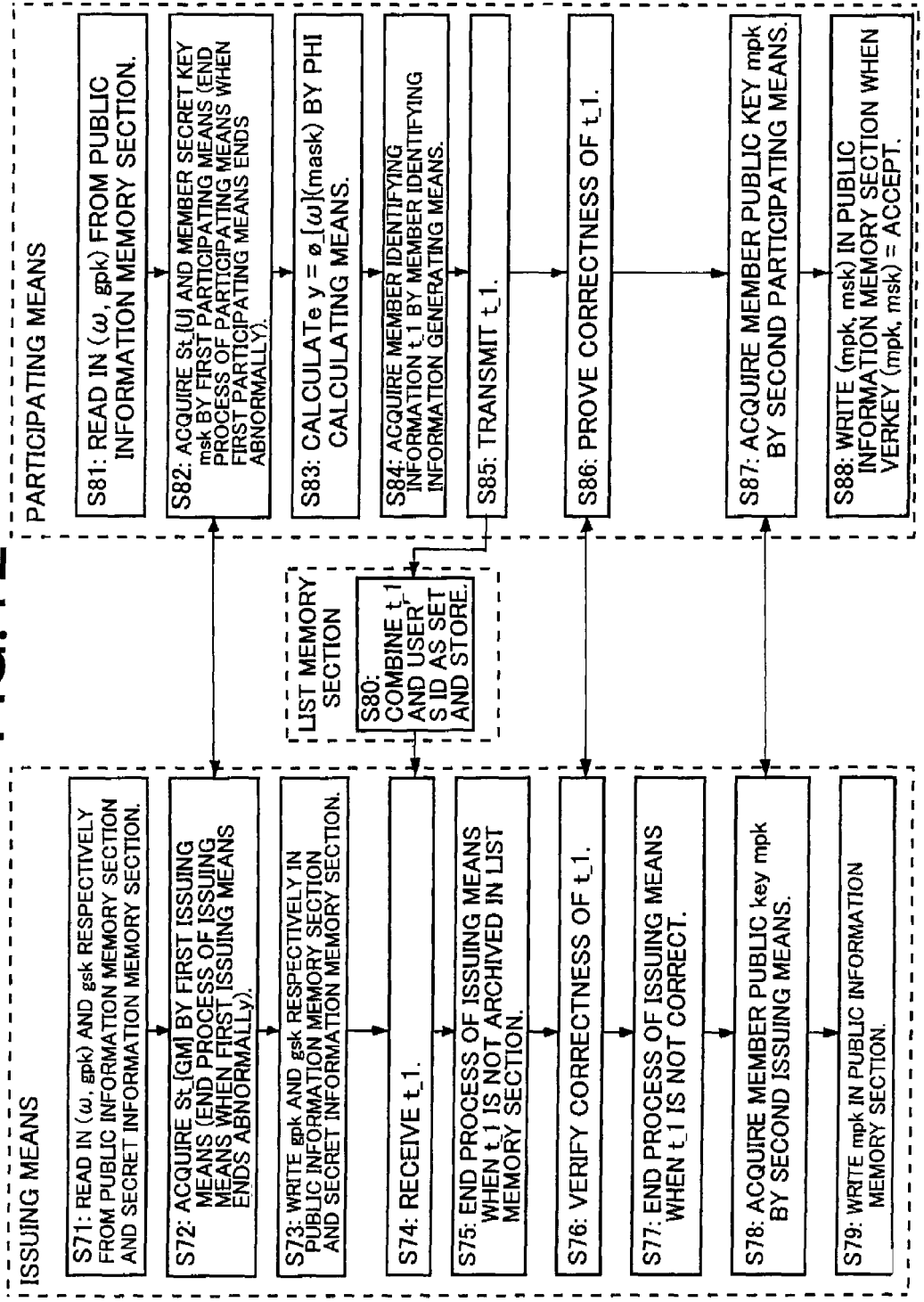
FIG. 12 is a flowchart illustrating the process sequence of the issuing means and the participation means of FIG. 1 (Example 5)

Referring to FIG. 12, the GM device 100 firstly reads in (ω, gpk) and gsk respectively from the public information memory section 104 and the secret information memory section 103 (Step S71).

The user device 300 reads in (ω, gpk) from the public information memory section 304 (Step S81).

Then, the GM device 100 and the user device 300 respectively execute the process of the first issuing means and that of the first participating means, communicating with each other, and the GM device 100 acquires St_{GM} while the user device 300 acquires St_{U} and member secret key msk (Steps S72, S82). However, if either the GM device 100 or the user device 300 abnormally terminates the process of the first issuing means or the process of the first participating means, which ever appropriate, they respectively ends the process of the issuing means 102 and that of the participating means 301 (Steps S72, S82).

Thereafter, the GM device 100 writes gpk and gsk respectively in the public information memory section 104 and the secret information memory section 103 (Step S73).

Subsequently, the user device 300 executes the process of the phi calculating means and calculates $y=\emptyset\_\{\omega\}(msk)$ (Step S83).

Then, the user device 300 executes the member identifying information generating means and acquires member identifying information t_1 (Step S84). Thereafter, the user device 300 transmits t_1 to the list memory device 200 (Step S85).

The list memory device 200 combines the received t_1 and the ID of the user device 300 as a set and stores them in the list memory section 201 (Step S80).

Then, the GM device 100 receives t_1 from the list device 200 (Step S744). If the list device 200 does not archive t_1, the GM device 100 ends the program of the issuing means (Step S75). When the GM device 100 succeeds in receiving t_1 from the list device 200, then the user device 300 proves the correctness of t_1 to the GM device 100 and the GM device 100 verifies the proof (Steps S86, S76). Any technique may be used to prove the correctness. For example, the technique described in the Non-Patent Document 3 may be used.

If the proof of the user device 300 is not correct, the GM device 100 ends the process of the issuing means (Step S77). If, on the other hand, the proof of the user device 300 is correct, the GM device 100 and the user device 300 respectively execute the process of the second issuing means and that of the second participating means and both of them acquire member public key mpk (Steps S78, S87).

Then, the GM device 100 writes msk in the public information memory section 104 (Step S79).

The user device 300 calculates verkey (mpk, msk) by executing the process of the member key verifying means and writes (mpk, msk) in the public information memory section 304 when verkey (mpk, msk)=accept (Step S88).

Figure 17:
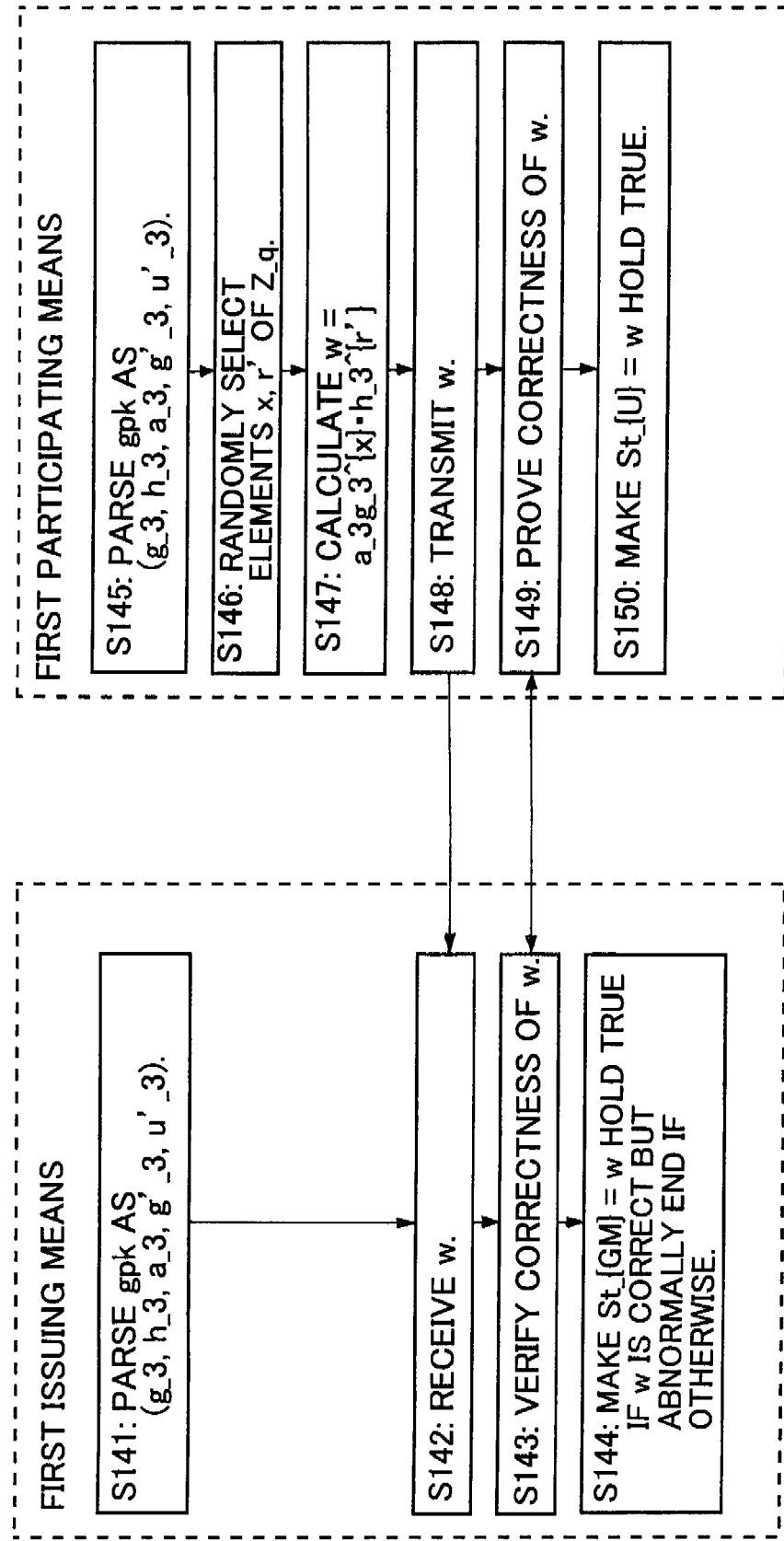
FIG. 17 is a flowchart of the process sequence of the first issuing means and the first participation means that are employed respectively in the issuing means and the participation means of FIG. 1 (Example 5)

Now, the process of the first issuing means and that of the first participating means will be described by referring to FIG. 17.

Referring to 17, the GM device 100 firstly parses GM public key gpk as $(g\_3, h\_3, a\_3, g'\_3, u'\_3)$ (Step S 141). The user device 300 also parses GM public key gpk as $(g\_3, h\_3, a\_3, g'\_3, u'\_3)$ (Step S145).

Then, the user device 300 randomly selects elements x, r' of $Z\_q$ (Step S146). Thereafter, the user device calculates $w=a\_3g\_3^{\{x\}} \cdot h\_3^{\{r'\}}$ (Step S147). Subsequently, the user device 300 transmits w to the GM device 1 (Step S148). Then, the GM device 100 receives w (Step S142).

Subsequently, the user device 300 verifies the correctness of w to the GM device 1 and the GM device 100 by turn verifies its correctness (Steps S149, S143). Any technique may be used to prove the correctness. For example the technique described in the Non-Patent Document 3 may be used.

If w is correct, the GM device 100 makes $St\_\{GM\}=w$ hold true and normally ends the process of the first issuing means although, if w is not correct, the GM device 100 abnormally ends the process (Step S144). Finally, the user device 300 makes $St\_\{U\}=w$ hold true and normally ends the process of the first participating means (Step S150).

Now, the process of the phi calculating means will be described below by referring to FIG. 18.

Figure 18:
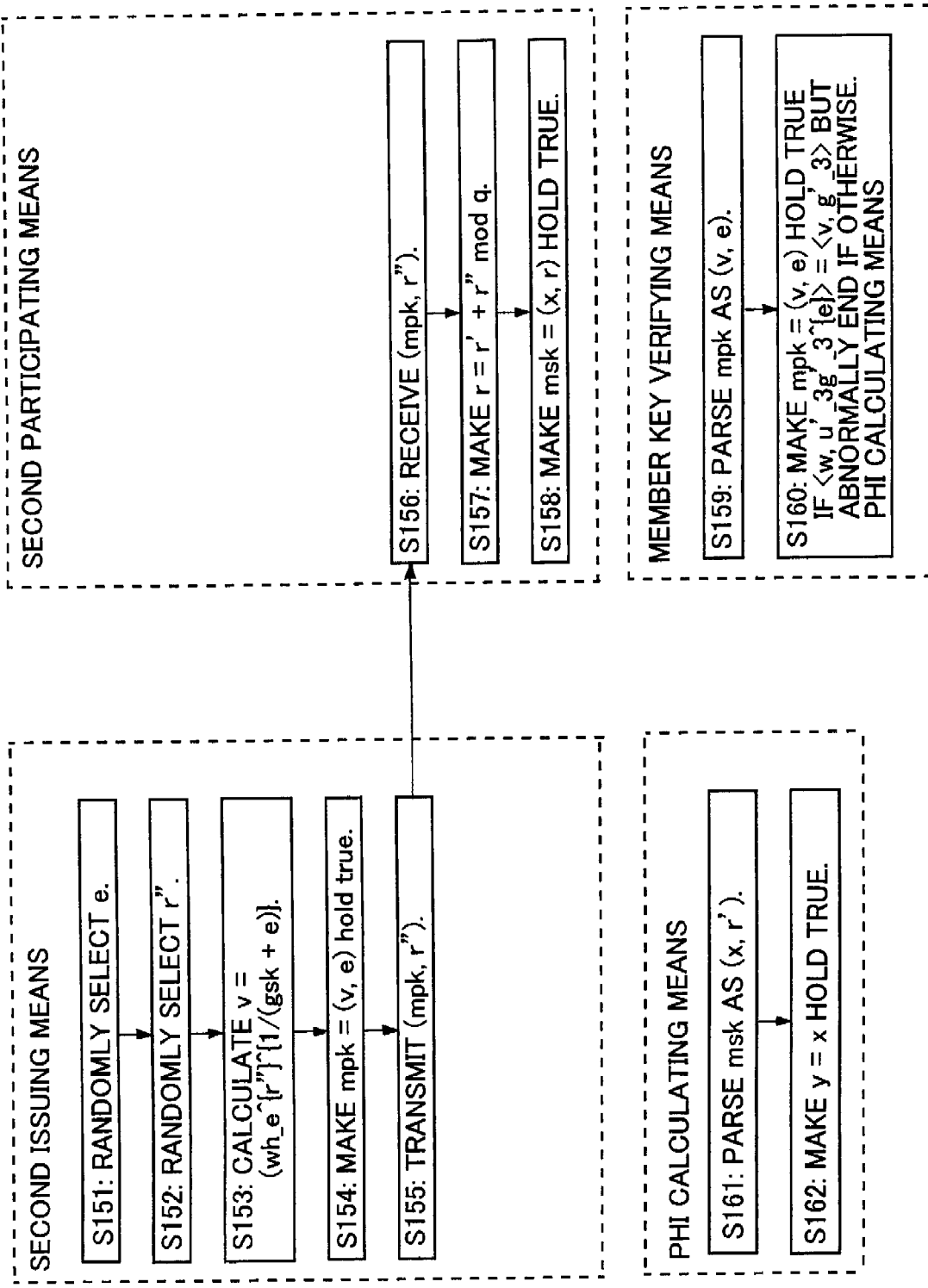
FIG. 18 is a flowchart of the process sequence of the second issuing means, the second participation means and the phi calculating means used in the issuing means and the participation means of FIG. 1 (Example 5)

Referring to FIG. 18, the user device 300 parses msk as (x, r') (Step S161) and then it makes y=x hold true (Step S162).

Now, the process of the member identifying information generating means will be described below by referring to FIG. 7.

The user device 300 executes the process of the member identifying information generating means as described earlier for Example 3 (FIG. 7) and computes $t\_1=v\_\{\omega\}(y)=g\_1\hat{}y$ (Step S22). Note that g_1 is predetermined public information. While any device may publicize g_1 by means of any technique, it is desirable to set g_1 to some Hash value from a safety point of view.

Now, the process of the second issuing means and that of the second participating means will be described by referring to FIG. 18.

Referring to FIG. 18, the GM device 100 randomly selects elements e, r" of Z_q (Steps S151, S152) and calculates $v=(wh\_3\hat{}\{r"\})\hat{}\{1/(gsk+e)\}$ (Step S153). Then, the GM device 100 makes mpk=(v, e) hold true (Step S154). Then, the GM device 100 transmits (mpk, r") to the user device 300 (Step S155).

As the user device 300 receives (mpk, r") (Step S156), it makes r=r'+r" mod q and msk=(x, r) hold true (Steps S157, S158).

Now, the process of the member key verifying means will be described below by referring to FIG. 18.

Referring to FIG. 18, the user device 300 parses mpk as (v, e) (Step S159).

The user device 300 checks if $<w, u'\_3g'\_3\hat{}\{e\}>=<v, g'\_3>$ holds true or not. The user device 300 makes mpk=(v, e) hold true if $<w, u'\_3g'\_3\hat{}\{e\}>=<v, g'\_3>$ holds true, where as it abnormally ends the process if otherwise (Step S160).

Now, the process of the AP setup means 401 of the AP device 400 will be described below by referring to FIG. 11.

Referring to FIG. 11, before executing the process of the AP setup means 401, the AP device 400 needs to determine the upper limit value k by the number of which the user device 300 is allowed to access. Any technique may be used to determine the value of k.

The AP device 400 firstly reads in security parameter a, its own identifier ID and upper limit value k from the public information memory section 403 (Step S64).

Then, the AP device 400 executes the process of the key for tag creating means of Example 3 (FIG. 7) and acquires AP public key apk (Step S65). Finally, the AP device 400 writes apk into the public information memory section AP3 (Step S66).

The user device 300 and the AP device 400 respectively execute the process of the group proving means 302 and the group verifying means 403, communicating with each other.

Now, the group proving means 302 of the user device 300 and the group verifying means 303 of the AP device 400 will be described by referring to FIG. 13.

Figure 13:
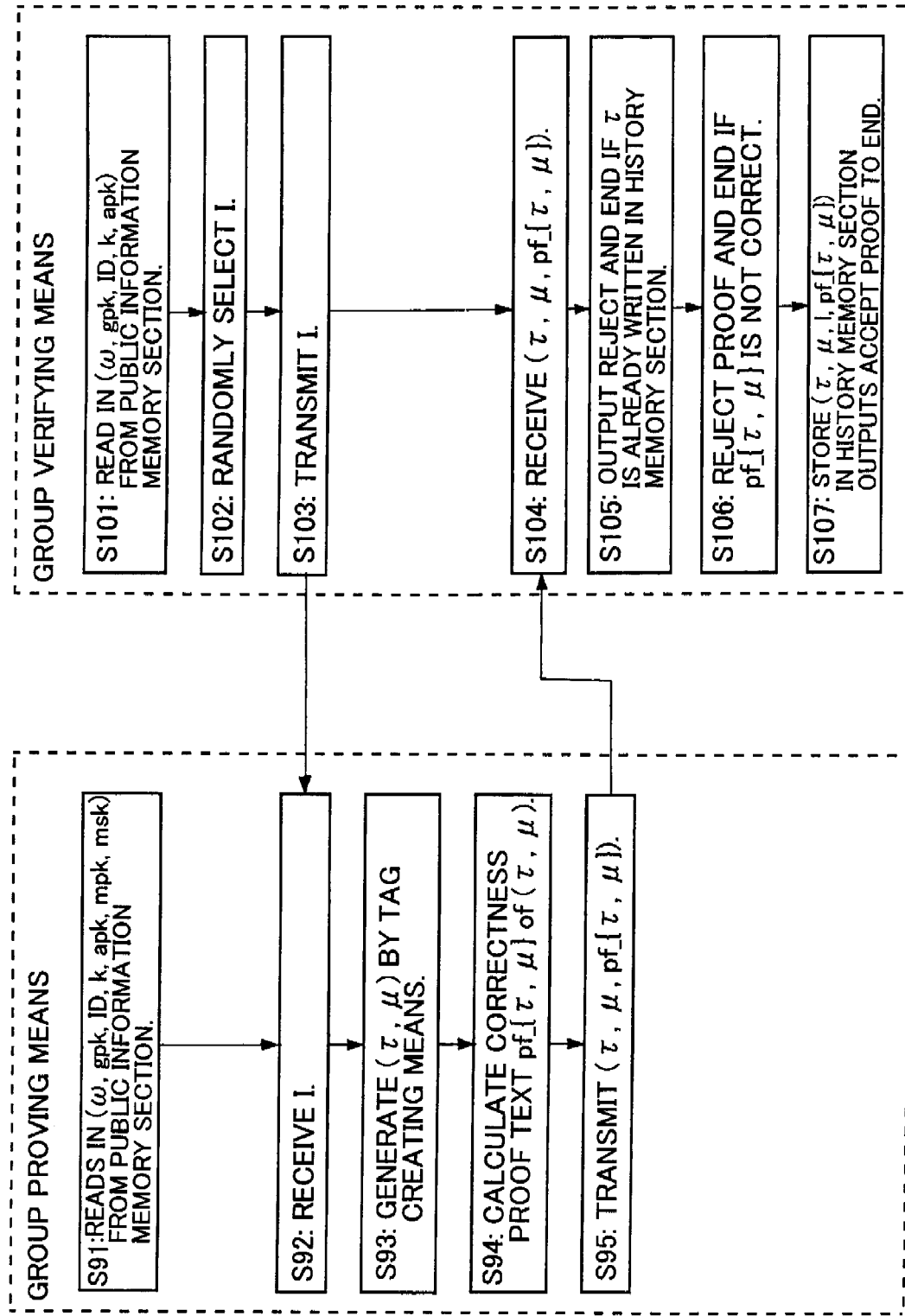
FIG. 13 is a flowchart illustrating the process sequence of the group proving means and the group verifying means of FIG. 1 (Example 5)

Referring to FIG. 13, firstly the user device 300 reads in ($\omega$, gpk, ID, k, apk, mpk, msk) from the public information memory section 304 (Step S91).

The AP device 400 reads in ($\omega$, gpk, ID, k, apk) from the public information memory section 404 (Step S101).

Then, the AP device 400 randomly selects l (Step S102) and transmits l to the user device 300 (Step S103).

As the user device 300 receives l (Step S92), it executes the process of the tag creating means of Example 3 (FIG. 7) to generate knowledge ($\tau$, $\mu$) (Step S93).

Assume that $ver\_\{spk\}(\beta, S)$ is a function that outputs accept when $<S, h'\_2g'\_2\hat{}\beta>=<g\_2, g'\_s>$ holds true but outputs reject when the equation does not hold true.

Then, the user device 300 prepares correctness proof text $pf\_\{\tau, \mu\}$ of knowledge ($\tau$, $\mu$) (Step S94 and transmits ($\tau$, $\mu$, $pf\_\{\tau, \mu\}$) to the AP device 400 (Step S95).

Now, the process of preparing proof text $pf\_\{\tau, \mu\}$ will be described by referring to FIGS. 19 and 20.

Figure 19:
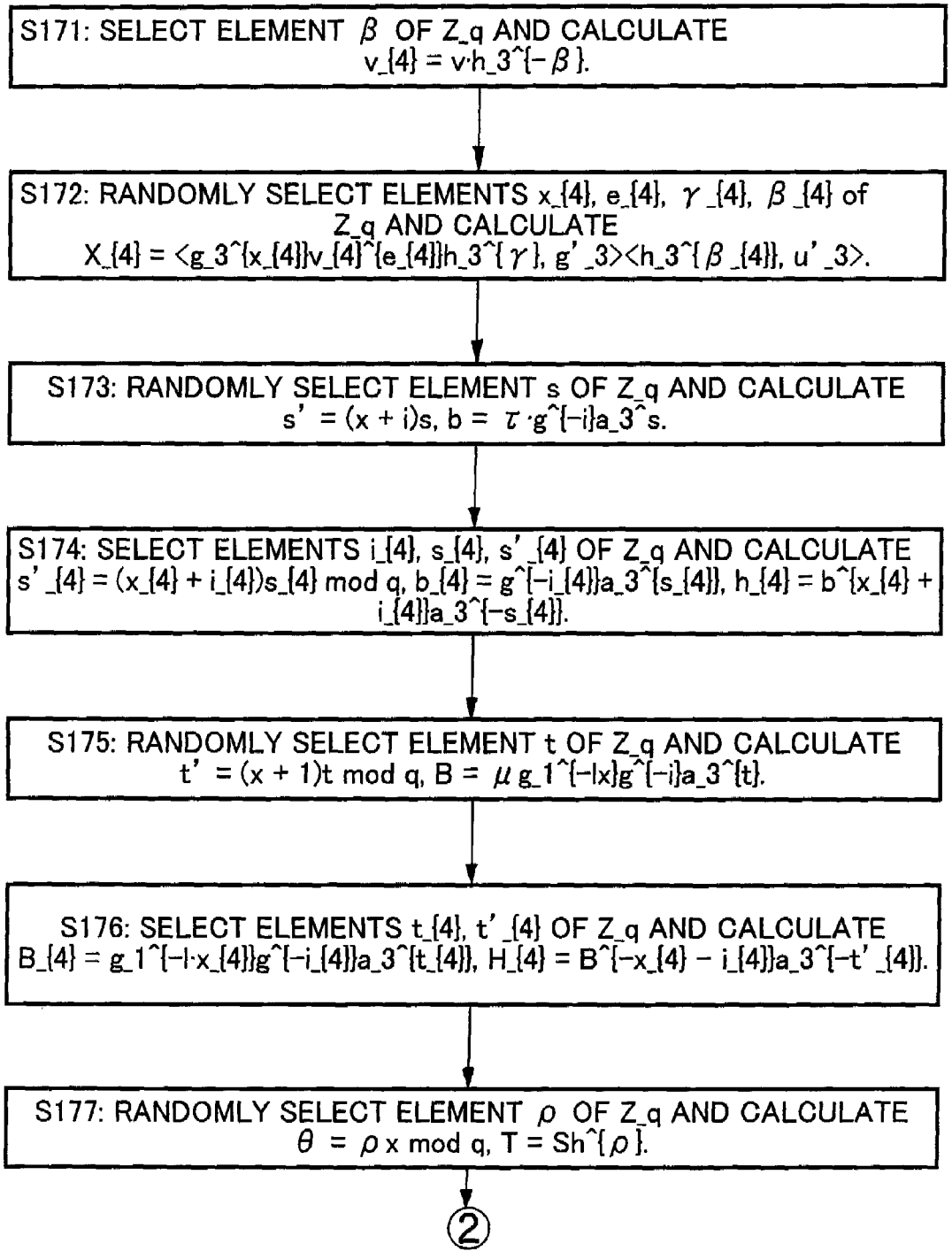
FIG. 19 is a flowchart of the process sequence of the proof text preparing method of the user device of FIG. 1 (Example 5)

Referring to FIG. 19, firstly the user device 300 selects element $\beta$ of Z_q and calculates $v\_\{4\}=v\cdot h\_3\hat{}\{-\beta\}$ (Step S171).

Then, the user device 300 randomly selects elements $x\_\{4\}$, $e\_\{4\}$, $\gamma\_\{4\}$, $\beta\_\{4\}$ of Z_q and calculates $X\_\{4\}=<g\_3\hat{}\{x\_\{4\}\}v\_\{4\}\hat{}\{e\_\{4\}\}h\_3\hat{}\{\gamma\}$, $g'\_3><h\_3\hat{}\{\beta\_\{4\}\}, u'\_3>$ (Step S172).

Next, the user device 300 randomly selects element s of Z_q and calculates $s'=(x+i)s$, $b=\tau\cdot g\hat{}\{-i\}a\_3\hat{}s$ (Step S173).

Subsequently, the user device 300 selects elements $i\_\{4\}$, $s\_\{4\}$, $s'\_\{4\}$ of Z_q and calculates elements $s'\_\{4\}=(x\_\{4\}+i\_\{4\}, s\_4) \mod q$, $b\_\{4\}=g\hat{}\{-i\_\{4\}\}a\_3\hat{}\{s\_\{4\}\}$, $h\_\{4\}=b\hat{}\{x\_\{4\}+i\_\{4\}\}a\_3\hat{}\{-s'\_\{4\}\}$ of Z_g (Step S174).

Thereafter, the user device 300 randomly selects element t of Z_q and calculates $t'=(x+1)t \mod q$, $B=\mu g\_1\hat{}\{-lx\}g\hat{}\{-i\}a\_3\hat{}\{t\}$ (Step S175).

Then, the user device 300 selects elements $t\_\{4\}, t'\_\{4\}$ of Z_q and calculates $B\_\{4\}=g\_1\hat{}\{-l\cdot x\_\{5\}\}g\hat{}\{-i\_\{4\}\}a\_3\hat{}\{t\_\{4\}\}$, $H\_\{4\}=B\hat{}\{-x\_\{4\}-i\_\{4\}\}a\_3\hat{}\{-t'\_\{4\}\}$ (Step S176).

Thereafter, the user device 300 randomly selects element $\rho$ of Z_q and calculates $\theta=\rho x \mod q$, $T=Sh\hat{}\{\rho\}$ (Step S177).

Figure 20:
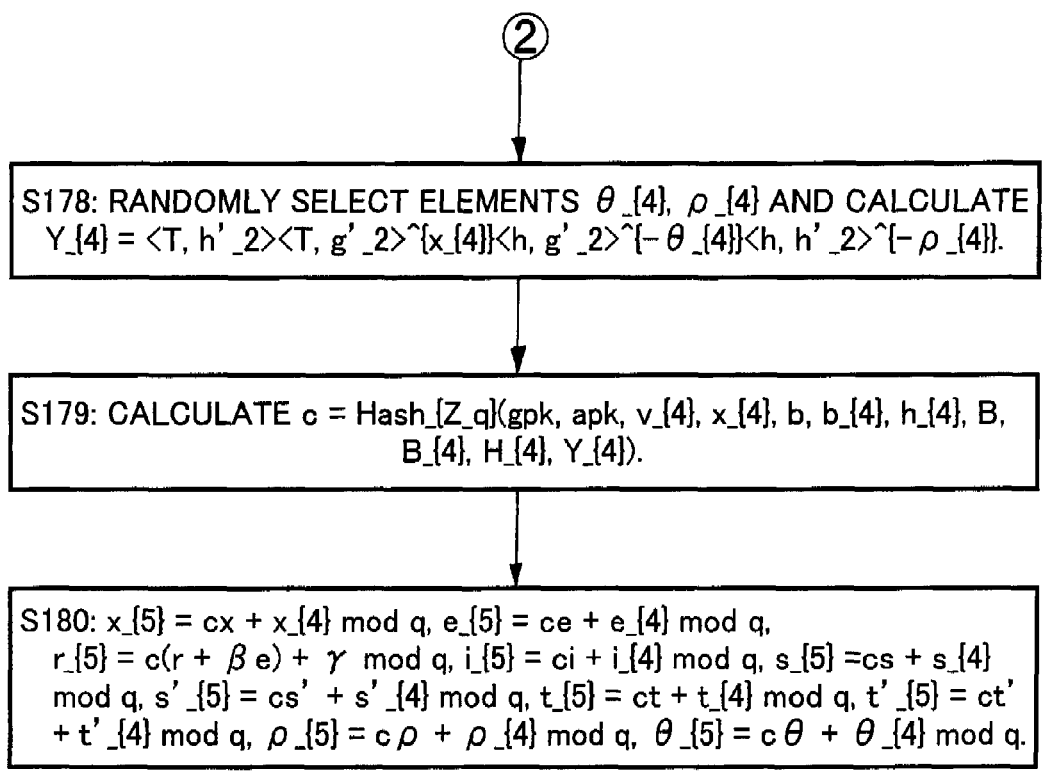
FIG. 20 is a flowchart of the process sequence of the proof text preparing method of the user device of FIG. 1 (Example 5)

Now, referring to FIG. 20, the user device 300 randomly selects elements $\theta\_\{4\}$, $\rho\_\{4\}$ of element Z_p and calculates $Y\_\{4\}=<T, h'\_2><T, g'\_2>\hat{}\{x\_\{4\}\}<h, g'\_2>\hat{}\{-\theta\_\{4\}\}<h, h'\_2>\hat{}\{-\rho\_\{4\}\}$ (Step S178).

Then, the user device 300 calculates $c=Hash\_\{Z\_q\}(gpk, apk, v\_\{4\}, x\_\{4\}, b, b\_\{4\}, h\_\{4\}, B, B\_\{4\}, H\_\{4\}, Y\_\{4\})$ (Step S179). Note that $Hash\_\{Z\_q\}$ represents a Hash function that takes a value at Z_q.

Then, the user device 300 calculates $x\_\{5\}=cx+x\_\{4\} \mod q$, $e\_\{5\}=ce+e\_\{4\} \mod q$, $r\_\{5\}=c(r+\beta e)+\gamma \mod q$, $i\_\{5\}=ci+i\_\{4\} \mod q$, $s\_\{5\}=cs+s\_\{4\} \mod q$, $s'\_\{5\}=cs'+s'\_\{4\} \mod q$, $t\_\{5\}=ct+t\_\{4\} \mod q$, $t'\_\{5\}=ct'+t'\_\{4\} \mod q$, $\rho\_\{5\}=c\rho+\rho\_\{4\} \mod q$, $\theta\_\{5\}=c\theta+\theta\_\{4\} \mod q$ (Step S180).

Finally, the user device makes $pf\_\{\tau, \mu\}=(b, B, c, x\_\{5\}, e\_\{5\}, r\_\{5\}, i\_\{5\}, s\_\{5\}, s'\_\{5\}, t\_\{5\}, t'\_\{5\}, \rho\_\{5\}, \theta\_\{5\})$ hold true.

Now, let's return to FIG. 13 to continue the above description.

Referring to FIG. 13, as the AP device 400 receives ($\tau$, $\mu$, $pf\_\{\tau, \mu\}$) (Step S104), it checks if $\tau$ is already written in the history memory section 404 or not. If $\tau$ is already written in the history memory section 404, it outputs reject and ends the process of the group verifying means 403 (Step S105).

Then, the AP device 400 verifies the correctness of $pf\_\{\tau, \mu\}$ and, if $pf\_\{\tau, \mu\}$ is not correct, it outputs reject and ends the process of the group verifying means (Step S106). On the other hand, if pf_$\{\tau, \mu\}$ is correct, it describes $(\tau, \mu, 1, pf\_\{\tau, \mu\})$ in the history memory section 404 and outputs accept to end the process of the group verifying means 403 (Step S107).

The technique of verifying the correctness of pf_$\{\tau,\mu\}$ will be described below by referring to FIG. 21.

Firstly, the AP device 400 calculates $X\_\{4\}=<g\_3^\{x\_\{5\}\}v\_\{4\}^\{e\_\{5\}\}h\_3^\{r\_\{5\}, g'\_3><h\_3^\{r\_\{5\}\}, u'\_3>(<a\_3, g\_3>/<v\_\{4\}, u'\_3>)^c$ (Step S181) as shown in FIG. 21.

Then, the AP device 400 calculates $b\_\{4\}=(\tau b^\{-1\})^\{-c\}g^\{-i\_\{5\}\}a\_3^\{s\_\{5\}\}$ (Step S182).

Subsequently, the AP device 400 calculates $h\_\{4\}=h^\{c\}b^\{x\_\{4\}+i\_\{4\}\}a\_3^\{-s'\_\{5\}\}$ (Step S183).

Thereafter, the AP device 400 calculates $B\_\{4\}=(B^\{-1\}\mu)^\{c\}g\_1\{-1\cdot x\_\{5\}\}g^\{-i\_\{5\}\}a\_3^\{t\_\{5\}\}$ (Step S184).

Then, the AP device 400 calculates $H\_\{4\}=B^\{-x\_\{5\}-i\_\{rej\}\}a\_3^\{-t'\_\{5\}\}$ (Step S185).

Subsequently, the AP device 400 calculates $C\_\{4\}=C^\{-c\}g^\{x\_\{5\}\}h^\{\rho\_\{5\}\}$ (Step S186).

Thereafter, the AP device 400 calculates $Y\_\{4\}=<g\_2, g\_2>^\{-c\}<T, h'\_2><T,g'\_2>^\{x\_\{4\}\}<h, g'\_2>^\{-\theta\_\{4\}\}<h, h'\_2>^\{-\rho\_\{4\}\}$ (Step S187).

Finally, the AP device 400 checks if $c=Hash\_\{Z\_q\}(gpk, apk, v\_\{4\}, X\_\{4\}, b, b\_\{4\}, h\_\{4\}, B, B\_\{4\}, H\_\{4\})$ holds true or not. It accepts pf_$\{\tau,\mu\}$ if $c=Hash\_\{Z\_q\}(gpk, apk, v\_\{4\}, X\_\{4\}, b, b\_\{4\}, h\_\{4\}, B, B\_\{4\}, H\_\{4\}, Y\_\{4\})$ holds true, where as it rejects pf_$\{\tau, \mu\}$ otherwise (Step S188).

Now, the process of the tracing means 501 of the tracing device 500 will be described below by referring to FIGS. 14 and 15.

Figure 14:
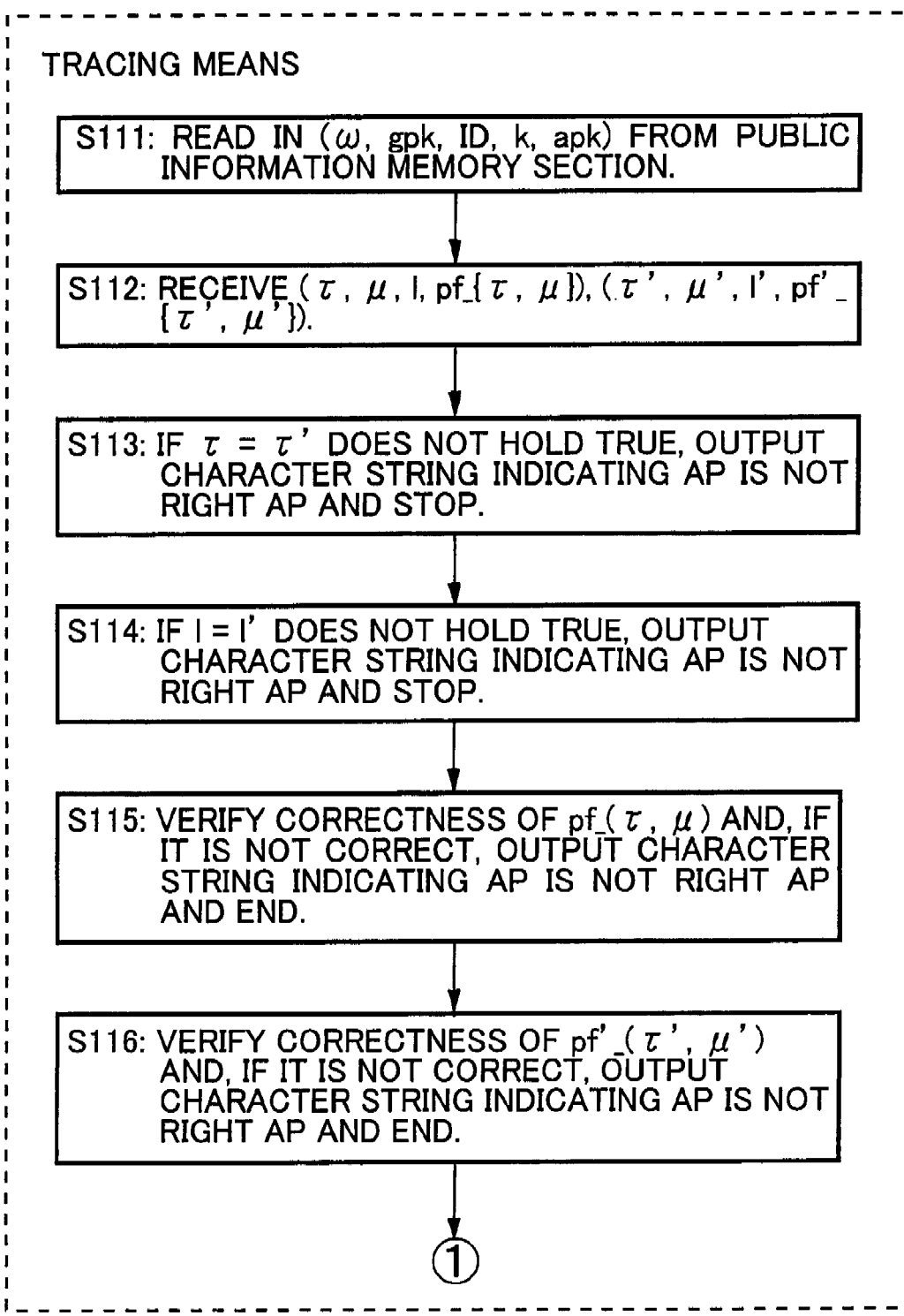
FIG. 14 is a flowchart of the process sequence of the tracing means of FIG. 1 (Example 5)

Referring to FIG. 14, firstly the tracing device 500 reads in ($\omega$, gpk, ID, k, apk) from the public information memory section 502 (Step S111).

Then, the tracing device 500 receives data $(\tau, \mu, 1, pf\_\{\tau, \mu\}), (\tau', \mu', 1', pf'\_\{\tau', \mu'\})$ (Step S112). At this time, it does not matter when the AP device 400 transmits $(\tau, \mu, pf\_\{\tau, \mu\}), (\tau', \mu', 1', pf'\_\{\tau', \mu'\})$ to the tracing device 500.

Thereafter, the tracing device 500 checks if $\tau=\tau'$ holds true or not. If $\tau=\tau'$ does not hold true, it outputs a character string meaning that "the AP device 400 sent incorrect data $(\tau, \mu, 1, pf\_\{\tau,\mu\}), (\tau', \mu', 1', pf'\_\{\tau', \mu'\})$ to the tracing device 500" and ends the process of the tracing means 501 (Step S113).

Subsequently, the tracing device 500 checks if l=l' holds true or not. If l=l' does not hold true, it outputs a character string meaning that "the AP device 400 sent incorrect data $(\tau, \mu, 1, pf\_\{\tau,\mu\}), (\tau', \mu', 1', pf'\_\{\tau', \mu'\})$ to the tracing device 500" and ends the process of the tracing means 501 (Step S114).

Then, the tracing device 500 checks if pf_$\{\tau, \mu\}$ is correct or not. If pf_$(\tau, \mu)$ is not correct, it outputs a character string meaning that "the AP device 400 sent incorrect data $(\tau, \mu, 1, pf\_(\{\tau,\mu\}), (\tau', \mu', 1', pf'\_\{\tau', \mu'\})$ to the tracing device 5" and ends the process of the tracing means 501 (Step S115).

Thereafter, the tracing device 500 checks if pf'_$\{\tau', \mu'\}$ is correct or not. If pf'_$(\tau', \mu')$ is not correct, it outputs a character string meaning that "the AP device 400 sent incorrect data $(\tau, \mu, 1, pf\_\{\tau, \mu\})), (\tau', \mu', 1', pf'\_\{\tau', \mu'\})$ to the tracing device 500" and ends the process of the tracing means 501 (Step S116).

Figure 15:
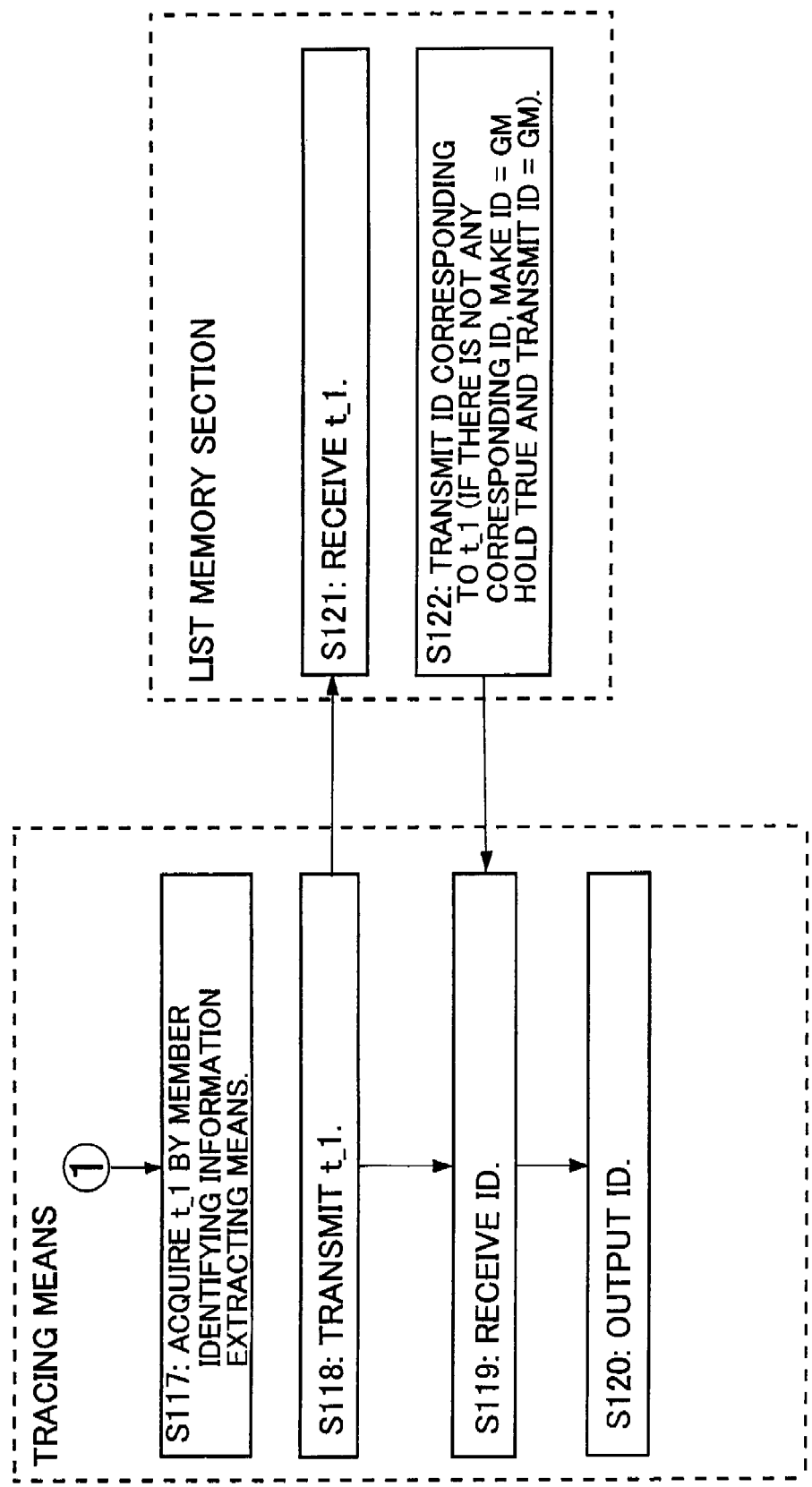
FIG. 15 is a flowchart of the process sequence of the tracing means and the list memory section of FIG. 1 (Example 5)

Now, referring to FIG. 15, then the tracing device 500 executes the process of the member identifying information extracting means of Example 3 (FIG. 7) to acquire member identifying information t_1 (Step S117).

Then, the tracing device 500 transmits t_1 to the list memory device 200 (Step S118). As the list memory device 200 receives t_1 (Step S121), it transmits ID that corresponds to t_1 to the tracing device 500 (Step S122). If there is not any corresponding ID, it makes ID=GM holds true and transmits ID=GM.

Thereafter, the tracing device 500 receives ID that corresponds to t_1 (Steps S122, S119). Finally, the tracing device 500 outputs ID (Step S120).

Thus, with this example, like above-described Examples 3 and 4, since the number of data that the user needs to calculate is O(log k) unlike the known number-limited anonymous authentication techniques, the quantity of calculation on the part of the user at the time of authentication is not proportional to the limited number of times k and hence it is possible to realize an efficient number-limited anonymous authentication system.

EXAMPLE 6

This is an example of application of a number of times limiting anonymous authentication system using a pseudo-random function calculating device according to the present invention.

The configuration of the system and that of the device of this example will be described below by referring to FIG. 1.

The number of times limiting anonymous authentication system illustrated in FIG. 1 is formed by adding various calculating sequences to the above-described systems of Examples 3 and 4. It comprises as functional components thereof five devices including a GM device 100, a list memory device 200, a user device 300, an AP device 400 and a tracing device 500. The above-described pseudo-random function calculating device is applied to the group signature means (group proving means, group verifying means), which will be described in greater detail herein after.

The GM device 100, the list memory device 200, the user device 300 and the tracing device 500 have respective configurations same as those of Example 5. While the AP device 400 comprises a group verifying means 402, a public information memory section 403, a history memory section 404 and a communication means 405 like the AP device 400 of Example 5, it does not comprise any AP setup means 401. In other words, the system configuration of this Example is same as that of FIG. 1 less the AP setup means 401.

The devices 100 through 500 can typically be realized by means of the CPU (of a server machine, a client machine or the like), a memory device, a network interface section and various input/output devices of a computer. In this example, each of the means 101, 102, 301, 302, 501 is realized as the CPU of the computer executes commands of a computer program on the memory device. The computer program is defined in advance according to the processing algorithms (which will be described in greater detail herein after) of the means. The public information memory sections 104, 304, 403, 502, the secret information memory sections 103, 303, the list memory section 201 and the history memory section 404 are installed in the memory devices of the computers. The communication means 105, 202, 305, 405, 503 correspond to the network interface sections of the computers.

While five devices of five different types are provided in FIG. 1 as the simplest arrangement, two or more than two devices of each type may be provided. While the devices are different machines in the instance of FIG. 1, a single machine may be adapted to operate as devices of two different types.

For example, a machine having the functional feature of the GM device 100 and that of the list memory device 200 may be used.

The GM device 100, the list memory device 200, the user device 300, the AP device 400 and the tracing device 500 can communicate with each other by means of the related respective communication means 105, 202, 305, 405, 503. While communication media that can be used for the purpose of the present invention include the Internet, electric waves and telephone lines, any communication media may be used for the purpose of the present invention.

Each of the GM device 100, the user device 300, the AP device 400 and the tracing device 500 store the public information it publicizes and also the public information the other devices publicize in the public information memory section 104, 304, 403 or 502, which ever appropriate. The list memory device 200 has a list memory section 201 as part thereof for storing public information. The list memory device 200 stores the public information it publicizes and also the public information the other devices publicize in the list memory section 201.

The devices 100 through 500 can acquire public information that other devices publicize by some means or other. Any means for acquiring public information may be used. For example, any of the devices 100 through 500 can directly acquire a specific piece of public information from the device that publicizes the information by means of the related communication means. Alternatively, it can receive from the server having a list of pieces of public information by way of the related communication means.

The GM device 100 and the user device 300 store secret information respectively in the secret information memory sections 103, 303.

Security parameter $\omega$ is distributed to the devices 100 through 300 in advance. Any appropriate technique can be used to distribute the security parameter $\omega$. Similarly, any appropriate technique can be used to determine the security parameter $\omega$.

Specific IDs are assigned respectively to the user device 300 and the AP device 400 and the devices 100 through 500 know in advance the IDs of all the user device 300 and that of the AP device 400. Any data may be used as ID and any technique may be used to distribute the IDs. For example, the name of the property of the device, the IP address assigned to the device, the MAC address assigned to the device or a random number may be used as ID of the device.

All the means of Example 6 are same as those of Example 5 except the group proving means 302, the group verifying means 402 and the tracing means 501.

Now, the operation of this example will be described by referring to FIGS. 13 and 22 through 24. The process sequence illustrated in FIGS. 13 and 22 through 24 is realized as a computer program stored in the memory device of the computer and executed by the CPUs of the computers.

Firstly, the process of the group proving means 302 and that of the group verifying means 402 will be described by referring to FIG. 13.

The process of FIG. 13 is same as that of the group proving means 302 of Example 5 described above except Steps S93 and S94. The process of FIG. 13 is same as that of the group verifying means 402 of Example 5 described above except Step S104.

In Step S93, the group proving means 302 executes the process of the tag creating means not of Example 3 but of Example 4 (FIG. 10) and, in Step S104, it prepares proof text pf_$\{\tau, \mu\}$ according to FIGS. 22 and 23 instead of FIGS. 19 and 20.

Now, the technique of preparing proof text pf_$\{\tau, \mu\}$ will be described by referring to FIGS. 22 and 23.

Referring to FIG. 22, firstly the user device 300 selects element $\beta$ of Z_q and calculates $v\_\{4\}=v \cdot h\_3^\{-\beta\}$ (Step S191).

Then, the user device 300 randomly selects elements $x\_\{4\}$, $e\_\{4\}$, $\gamma\_\{4\}$, $\beta\_\{4\}$ of Z_q and calculates $X\_\{4\}=<g\_3^\{x\_\{4\}\}v\_\{4\}^\{e\_\{4\}\}h\_3^\{\gamma\}$, $g'\_3><h\_3^\{\beta\_\{4\}\}$, $u'\_3>$ (Step S192).

Next, the user device 300 randomly selects element s of Z_q and calculates $s'=(x+i)s$, $b=\tau \cdot g^\{-i\}a\_3^s$ (Step S193).

Subsequently, the user device 300 selects elements $i\_\{4\}$, $s\_\{4\}$, $s'\_\{4\}$ of Z_q and calculates element of Z_q or $s'\_\{4\}=(x\_\{4\}+i\_\{4\})s\_\{4\}$ mod q, $b\_\{4\}=g^\{-i\_\{4\}\}a\_3^\{s\_\{4\}\}$, $h\_\{4\}=b^\{x\_\{4\}+i\_\{4\}\}a\_3^\{-s\_\{4\}\}$ (Step S194).

Thereafter, the user device 300 randomly selects element t of Z_q and calculates $t'=(x+i)t$ mod q, $B=\mu g\_1^\{-1x\}g^\{-i\}a\_3^\{t\}$ (Step S195).

Then, the user device 300 selects elements $t\_\{4\}$, $t'\_\{4\}$ of Z_q and calculates $B\_\{4\}=g\_1^\{-1 \cdot x\_\{4\}\}g^\{-i\_\{4\}\}a\_3^\{t\_\{4\}\}$, $H\_\{4\}=B^\{-x\_\{4\}-i\_\{4\}\}a\_3^\{-t\_\{4\}\}$ (Step S196).

Thereafter, the user device 300 makes the smallest integer equal to N out of the integers not less than log_2 k (Step S197).

Now, referring to FIG. 23, the user device 300 makes the i-th bit of x equal to x_i and x'_i=1−x_i and z=k−x hold true and also makes the i-th bit of z equal to z_i and z'_i=1−z_i hold true for integers i=0, ..., N (Step S198).

Then, the user device 300 selects any of $\rho\_1, \ldots, \rho\_N$, $\theta\_1, \ldots \theta\_N$ of z_q that hold $\rho\_1+ \ldots +\rho\_N=\theta\_1+ \ldots +\theta\_N$ true and calculates $\rho=\rho\_1+ \ldots +\rho\_N$, $C\_1=h^\{\rho\_1\}, \ldots, C\_N=h^\{\rho\_N\}$, $D\_1=h^\{\theta\_1\}, \ldots, D\_N=h^\{\theta\_N\}$, $C=g^\{x\}h^\{\rho\}$, $D=g^\{k-x\}h^\{\rho\}$ (Step S199).

Subsequently, the user device 300 randomly selects elements $\rho\_\{4, i\}$, $\theta\_\{4, i\}$, $c'\_\{i, x'\_i\}$, $d'\_\{i, z'\_i\}$, $\rho\_\{5, i, x'\_i\}$, $\theta\_\{5, i, z'\_i\}$ of Z_q for i=1, ..., N, j=0, 1 and calculates $C\_(4, i, x\_i)=g^\{x\_i\}h^\{\rho\_\{4, i\}\}$, $D\_\{4, i, x\_i\}=g^\{z\_i\}h^\{\theta\_\{4, i\}\}$, $C\_\{4, i, x'\_i\}=C^\{-c'\_\{i, x'\_i\}\}g^\{x'\_i\}h^\{\rho\_\{5, i, x'\_i\}}$, $D\_\{4, i, x'\_i\}=D^\{-d'\_\{i, z'\_i\}\}g^\{z'\_i\}h^\{\theta\_\{5, i, z'\_i\}\}$ (Step S200).

Then, the user device 300 calculates c=Hash_$\{Z\_q\}$ (gpk, apk, $v\_\{4\}$, $X\_\{4\}$, b, $b\_\{4\}$, $h\_\{4\}$, B, $B\_\{4\}$, $H\_\{4\}$, $C\_\{4\}$, $\{C\_\{4, i, j\}\}\_\{i=1, \ldots, N, j=0, 1\}$, $\{D\_\{4, i, j\}\}\_\{i=1, \ldots, N, j=0, 1\}$) (Step S201). Note that Hash_$\{Z\_q\}$ represents a Hash function that takes a value at Z_q.

Thereafter, the user device 300 calculates $x\_\{5\}=cx+x\_\{4\}$ mod q, $e\_\{5\}=ce+e\_\{4\}$ mod q, $r\_\{5\}=c(r+\beta e)+\gamma$ mod q, $i\_\{5\}=ci+i\_\{4\}$ mod q, $s\_\{5\}=cs+s\_\{4\}$ mod q, $s'\_\{5\}=cs'+s'\_\{4\}$ mod q, $t\_\{5\}=ct+t\_\{4\}$ mod q, $t'\_\{5\}=ct'+t'\_\{4\}$ mod q, c_i=c−c'_i mod q, d_i=d−d'_i mod q, $\rho\_\{5, i, x\_i\}=c\_i\rho\_i+\rho\_\{4, i\}$ mod q, $\theta\_\{5, i, x\_i\}=c\_i\theta\_i+\theta\_\{4, i\}$ mod q (Step S202).

Finally, the user device 3 makes pf_$\{\tau, \mu\}$=(b, B, C, c, $x\_\{5\}$, $e\_\{5\}$, $r\_\{5\}$, $i\_\{5\}$, $s\_\{5\}$, $s'\_\{5\}$, $t\_\{5\}$, $t'\_\{5\}$, $\{c\_\{ij\}\}$) hold true (Step S203).

Referring to FIG. 13, as the AP device 400 receives $(\tau, \mu, pf\_(\tau, \mu))$ (Step S104), it checks if $\tau$ is already written in the history memory section BAP4 or not. If $\tau$ is already written in the history memory section BAP4, it outputs reject and ends the process of the group verifying means 402 (Step S105).

Then, the AP device 400 verifies the correctness of pf_$\{\tau, \mu\}$ and, if pf_$\{\tau, \mu\}$ is not correct, it outputs reject and ends the process of the group verifying means 402 (Step S106). On the other hand, if pf_$\{\tau, \mu\}$ is correct, it describes $(\tau, \mu, 1, pf\_\{\tau,$ $\mu\}$) in the history memory section 404 and outputs accept to end the process of the group verifying means 402 (Step S107).

The technique of verifying the correctness of pf_$\{\tau, \mu\}$ will be described below by referring to FIG. 24.

Firstly, the AP device 400 calculates $X\_\{4\}=<g\_3\^\{x\_\{5\}\}v\_\{4\}\^\{e\_\{5\}\}h\_3\^\{r\_\{5\}\}, g'\_3><h\_3\^\{r\_5\}\}, u'\_3>(<a\_3, g\_3>/<v\_\{4\}, u'\_3>)\^C$ (Step S211).

Then, the AP device 400 calculates $b\_\{4\}=(\tau b\^\{-1\})\^\{-c\}g\^\{-i\_\{5\}\}a\_3\^\{s\_\{5\}\}$ (Step S212).

Subsequently, the AP device 400 calculates $h\_\{4\}=h\^\{-c\}b\^\{x\_\{4\}+i\_\{4\}\}a\_3\^\{-s'\_\{5\}\}$ (Step S213).

Thereafter, the AP device 400 calculates $B\_\{4\}=(B\^\{-1\}\mu)\^\{c\}g\_1\^\{-1\cdot x\_\{5\}\}g\^\{-i\_\{5\}\}a\_3\^\{t\_\{5\}\}$ (Step S214).

Then, the AP device 400 calculates $H\_\{4\}=B\^\{-x\_\{5\}-i\_\{rej\}\}a\_3\^\{-t\_\{5\}\}$ (Step S215).

Subsequently, the AP device 400 calculates $C\_\{4\}=C\^\{-c\}g\^\{x\_\{5\}\}h\^\{\rho\_\{5\}\}$ (Step S216).

Next, the AP device 400 calculates $C\_\{4, i, j\}=C\_\{-c\_\{ij\}\}g\^\{j\}h\^\{\rho\_\{5, ij\}, D\_4, i, j\}=D\_\{-c\_\{ij\}\}g\^\{j\}h\^\{\theta\_\{5, ij\}\}$ for i=1, ..., N, j=0, 1 (Step S217).

Finally, the AP device 400 checks if c=Hash_$\{Z\_q\}$(gpk, apk, v_$\{4\}$, X_$\{4\}$, b, b_$\{4\}$, h_$\{4\}$, B, B_$\{4\}$, H_$\{4\}$, $\{C\_\{ij\}\}\_\{i=1, \ldots, N, j=0, 1\}$, $\{D\_\{ij\}\}\_\{i=1, \ldots, N, j=0, 1\}$) and c=c_1+c'_1=...=c_N+c'_N mod q hold true or not. It accepts pf_$\{\tau, \mu\}$ if both of them hold true, where as it rejects pf_$\{\tau, \mu\}$ otherwise (Step S218).

Thus, with this example, like above-described Examples 3 through 5, since the number of data that the user needs to calculate is O(log k) unlike the known number-limited anonymous authentication techniques, the quantity of calculation on the part of the user at the time of authentication is not proportional to the limited number of times k and hence it is possible to realize an efficient number-limited anonymous authentication system.

While the present invention is described in detail above by way of examples, it is by no means limited to the above-described examples, although they are typical examples and it may be clear to those skilled in the art that various modifications and alterations can be made to the present invention without departing from the scope of the present invention as defined in the appended claims. Any such modifications and alterations are also within the scope of the present invention.

For instance, the functional features of the components in each of the above-described examples can be realized at least partly by means of a processor (CPU) that operates under the control of a program, memories (ROM/RAM) having a memory region for storing a control program and control data, various input/output devices, external recording devices such as hard disk drive, communication device such as communication modem and LAN interface, displays such as CRT and liquid crystal display and various peripheral devices such as keyboard and pointing device. Then, the components such as a processor, memories and various input/output devices are all included within the scope of the present invention.

When the functional features of the components in each of the above-described examples are realized at least partly by means of program codes, the program codes and the recording medium storing them are also within the scope of the present invention. When the above-cited functional features are realized by coordination of the program codes, an operating system and application programs, those program codes are also within the scope of the present invention. Recording mediums that can be used for the purpose of the present invention include flexible disks, optical disks, magneto-optical disks, CD-ROMs, magnetic tapes and nonvolatile memory cards as well as hard disks and ROMs.

The invention claimed is:

1. A pseudo-random function calculating device comprising:
   key creating means for creating a public key made of a set of at least a first component and a second component as components constituting an element of a finite group and a secret key made of an integer, secretly saving the generated secret key in a memory device and opening the public key; and
   pseudo-random function calculating means for outputting the element of a finite group as function value of the pseudo-random function upon receiving an integer as input, wherein
   the pseudo-random function calculating means outputs as the element of a finite group the product of multiplication of the first element of the value obtained by calculating the modular exponentiation, using the first component of the public key and the input integer respectively as base and exponent, and the second element of the value obtained by calculating the modular exponentiation, using the second component of the public key and the reciprocal of the sum of the secret key and the input integer in a finite field respectively as base and exponent.

2. A pseudo-random function calculating device comprising:
   key creating means for creating a secret key made of an integer and secretly saving the generated secret key in a memory device; and
   pseudo-random function calculating means for outputting an element of a finite group as function value of a pseudo-random function upon receiving a set of a bit string and an integer as input, wherein
   the pseudo-random function calculating means outputs as the element of a finite group the product of multiplication of the first element of the value obtained by calculating the modular exponentiation, using a value determined by the input value and the input integer respectively as base and exponent, and the second element of the value obtained by calculating the modular exponentiation, using a value determined by the input value and the reciprocal of the sum of the secret key and the input integer respectively as base and exponent.

3. The device according to claim 2, wherein the base is the Hash value of the input value.

4. A number-limited anonymous authentication system using a pseudo-random function calculating device according to claim 1, comprising:
   input means for receiving an identifier, integers k, i, y and l and element t of a finite group;
   first tag calculating means for receiving the value determined by means of the identifier, the k and the i, using the y as secret key, and calculating the function value of a pseudo-random function taking a value in the finite group;
   second tag calculating means for receiving the value determined by means of the identifier, the k and the i, using the y as secret key, and calculating the function value of the pseudo-random function taking a value in the finite group and then the product of multiplication of the value obtained by raising the calculated pseudo-random function by the l-th power and t; and tag creating means for outputting a set of the outcome of calculation of the first tag calculating means and the outcome of calculation of the second tag calculating means.

5. A number-limited anonymous authentication system using a pseudo-random function calculating device according to claim 2, comprising:
input means for receiving an identifier, integers k, i, y and l and element t of a finite group;
first tag calculating means for receiving the value determined by means of the identifier, the k and the i, using the y as secret key, and calculating the function value of a pseudo-random function taking a value in the finite group;
second tag calculating means for receiving the value determined by means of the identifier, the k and the i, using the y as secret key, and calculating the function value of the pseudo-random function taking a value in the finite group and then the product of multiplication of the value obtained by raising the calculated pseudo-random function by the l-th power and t; and
output means for outputting a set of the outcome of calculation of the first tag calculating means and the outcome of calculation of the second tag calculating means.

6. The system according to claim 4, further comprising:
key for tag creating means including:
input means for receiving integer k as input;
key for electronic signature creating means for selecting a pair of a public key and a secret key of an electronic signature system;
plain text selecting means for selecting k integers;
electronic signature calculating means for determining by calculations a signature text for each of the k integers by using the pair of a public key and a secret key; and
output means for outputting a set of the public key of the electronic signature system, the k integers and k signed texts as public key for tag to be used for the calculation of the tag creating means.

7. The system according to claim 6, wherein
the electronic signature calculating means includes:
means for receiving as input an integer as a plain text;
means for calculating an inverse element in a finite field of the sum of a plain text and an integer; and
means for calculating the modular exponentiation, using the calculated inverse element as exponent, and outputting the outcome of calculation of the modular exponentiation as the public key for tag.

8. The system according to claim 7, wherein
the key for electronic signature creating means includes:
means for selecting an element from a finite group;
means for selecting an integer;
means for calculating the modular exponentiation, using the element and the integer respectively as base and exponent; and
means for outputting a set of the element of a finite group and the outcome of the calculation of the modular exponentiation.

9. The system according to claim 4, further comprising:
member identifying information extracting means including:
input means for receiving four data of τ, l, τ' and l', where τ is the outcome of the calculation made by inputting integer l to the tag creating means and τ' is the outcome of the calculation made by inputting l' to the tag creating means;
calculating means for calculating the modular exponentiation, using the value obtained by dividing the τ by the τ' and the reciprocal of the value obtained by subtracting the l' from the l in a finite field respectively as base and exponent; and
output means for outputting the outcome of the calculation of the modular exponentiation.

10. The system according to claim 5, further comprising:
member identifying information extracting means including:
input means for receiving four data of τ, l, τ' and l', where τ is the outcome of the calculation made by inputting integer l to the tag creating means and τ' is the outcome of the calculation made by inputting l' to the tag creating means;
calculating means for calculating the modular exponentiation, using the value obtained by dividing the τ by the τ' and the reciprocal of the value obtained by subtracting the l' from the l in a finite field respectively as base and exponent; and
output means for outputting the outcome of the calculation of the modular exponentiation.

11. The system according to claim 4, further comprising:
group proving means including:
input means for receiving a pair of a public key and a secret key as group member, the public key of an application provider (to be referred to as AP hereinafter) device, the identifier of the AP device and integers k, i and l;
means for producing integer y from the secret key as group member, receiving as input the identifier of the AP device and the k, i, l and y and calculating data for forming a tag by means of the tag creating means;
correctness proving means for calculating a correctness proof text of the tag; and
output means for outputting the tag and the correctness proof text.

12. The system according to claim 5, further comprising:
group proving means including:
input means for receiving a pair of a public key and a secret key as group member, the public key of an application provider (to be referred to as AP hereinafter) device, the identifier of the AP device and integers k, i and l;
means for producing integer y from the secret key as group member, receiving as input the identifier of the AP device and the k, i, l and y and calculating data for forming a tag by means of the tag creating means;
correctness proving means for calculating a correctness proof text of the tag; and
output means for outputting the tag and the correctness proof text.

13. The system according to claim 9, further comprising:
tracing means including:
input means for receiving as input a first set having element τ of a finite group, element μ of a finite group, integer l and proof text p and a second set having element τ' of a finite group, element μ' of a finite group, integer l' and proof text p';
first determining means for determining if the τ and the τ' are the same or not;
second determining means for determining if the l and the l' are the same or not;
third determining means for determining if the proof text p is correct or not;
fourth determining means for determining if the proof text p' is correct or not; and
identifier acquiring means for acquiring an identifier corresponding to the outcome of calculation of the member identifying information extracting means based on a previously set correspondence table.

14. The system according to claim 10, further comprising:
tracing means including:
input means for receiving as input a first set having element τ of a finite group, element μ of a finite group, integer l and proof text p and a second set having element τ' of a finite group, element μ' of a finite group, integer l' and proof text p';
first determining means for determining if the τ and the τ' are the same or not;
second determining means for determining if the l and the l' are the same or not;
third determining means for determining if the proof text p is correct or not;
fourth determining means for determining if the proof text p' is correct or not; and
identifier acquiring means for acquiring an identifier corresponding to the outcome of calculation of the member identifying information extracting means based on a previously set correspondence table.

15. A pseudo-random function calculating method comprising:
a key creating step of creating a public key made of a set of at least a first component and a second component as components constituting an element of a finite group and a secret key made of an integer, secretly saving the created secret key in a memory device and opening the created public key; and
a pseudo-random function calculating step of outputting the element of a finite group as function value of the pseudo-random function upon receiving an integer as input, wherein
the pseudo-random function calculating step outputs as the element of a finite group the product of multiplication of the first element of the value obtained by calculating the modular exponentiation, using the first component of the public key and the input integer respectively as base and exponent, and the second element of the value obtained by calculating the modular exponentiation, using the second component of the public key and the reciprocal of the sum of the secret key and the input integer in a finite field respectively as base and exponent.

16. A pseudo-random function calculating method comprising:
a key creating step of creating a secret key made of an integer and secretly saving the created secret key in a memory device; and
a pseudo-random function calculating step of outputting an element of a finite group as function value of a pseudo-random function upon receiving a set of a bit string and an integer as input, wherein
the pseudo-random function calculating step outputs as the element of a finite group the product of multiplication of the first element of the value obtained by calculating the modular exponentiation, using a value determined by the input value and the input integer respectively as base and exponent, and the second element of the value obtained by calculating the modular exponentiation, using a value determined by the input value and the reciprocal of the sum of the secret key and the input integer respectively as base and exponent.

17. The method according to claim 16, wherein the base is the Hash value of the input value.

18. A number-limited anonymous authentication method using a pseudo-random function calculating method according to claim 15, comprising:
a tag creating step including:
an input step of receiving an identifier, integers k, i, y and l and element t of a finite group;
a first tag calculating step of receiving the value determined by means of the identifier, the k and the i, using the y as secret key, and calculating the function value of a pseudo-random function taking a value in the finite group;
a second tag calculating step of receiving the value determined by means of the identifier, the k and the i, using the y as secret key, and calculating the function value of the pseudo-random function taking a value in the finite group and then the product of multiplication of the value obtained by raising the calculated pseudo-random function by the l-th power and t; and
a step of outputting a set of the outcome of calculation of the first tag calculating step and the outcome of calculation of the second tag calculating step.

19. A number-limited anonymous authentication method using a pseudo-random function calculating method according to claim 16, comprising:
a tag creating step including:
an input step of receiving an identifier, integers k, i, y and l and element t of a finite group;
a first tag calculating step of receiving the value determined by means of the identifier, the k and the i, using the y as secret key, and calculating the function value of a pseudo-random function taking a value in the finite group;
a second tag calculating step of receiving the value determined by means of the identifier, the k and the i, using the y as secret key, and calculating the function value of the pseudo-random function taking a value in the finite group and then the product of multiplication of the value obtained by raising the calculated pseudo-random function by the l-th power and t; and
a step of outputting a set of the outcome of calculation of the first tag calculating step and the outcome of calculation of the second tag calculating step.

20. The method according to claim 18, further comprising:
a key for tag creating step including:
an input step of receiving integer k as input;
a key for electronic signature creating step of selecting a pair of a public key and a secret key of an electronic signature system;
a plain text selecting step of selecting k integers;
an electronic signature calculating step of determining by calculations a signature text for each of the k integers by using the pair of a public key and a secret key; and
an output step of outputting a set of the public key of the electronic signature system, the k integers and the k signed texts as public key for tag to be used in the calculation of the tag creating step.

21. The method according to claim 20, wherein
the electronic signature calculating step includes:
a step of receiving as input an integer as a plain text;
a step of calculating an inverse element in a finite field of the sum of a plain text and an integer; and
a step of calculating the modular exponentiation, using the calculated inverse element as exponent, and outputting the outcome of calculation of the modular exponentiation as the public key for tag.

22. The method according to claim 21, wherein
the key for electronic signature creating step includes:
a step of selecting an element from a finite group;
a step of selecting an integer;
a step of calculating the modular exponentiation, using the element and the integer respectively as base and exponent; and
a step of outputting a set of the selected element of a finite group and the outcome of the calculation of the modular exponentiation.

23. The method according to claim 18, further comprising:
a member identifying information extracting step including:
an input step of receiving four data of $\tau$, l, $\tau'$ and l', where $\tau$ is the outcome of the calculation made by inputting integer l in the tag creating step and $\tau'$ is the outcome of the calculation made by inputting l' in the tag creating step;
a calculating step of calculating the modular exponentiation, using the value obtained by dividing the $\tau$ by the $\tau'$ and the reciprocal of the value obtained by subtracting the l' from the l in a finite field respectively as base and exponent; and
an output step of outputting the outcome of the calculation of the modular exponentiation.

24. The method according to claim 19, further comprising:
a member identifying information extracting step including:
an input step of receiving four data of $\tau$, l, $\tau'$ and l', where $\tau$ is the outcome of the calculation made by inputting integer l in the tag creating step and $\tau'$ is the outcome of the calculation made by inputting l' in the tag creating step;
a calculating step of calculating the modular exponentiation, using the value obtained by dividing the $\tau$ by the $\tau'$ and the reciprocal of the value obtained by subtracting the l' from the l in a finite field respectively as base and exponent; and
an output step of outputting the outcome of the calculation of the modular exponentiation.

25. The method according to claim 18, further comprising:
a group proving step including:
an input step of receiving a pair of a public key and a secret key as group member, the public key of an application provider (to be referred to as AP hereinafter) device, the identifier of the AP device and integers k, i and l;
a step of producing integer y from the secret key as group member, receiving as input the identifier of the AP device and the k, i, l and y and calculating data for forming a tag by means of the tag creating step;
a step of calculating a correctness proof text of the tag; and
an output step of outputting the tag and the correctness proof text.

26. The method according to claim 19, further comprising:
a group proving step including:
an input step of receiving a pair of a public key and a secret key as group member, the public key of an application provider (to be referred to as AP hereinafter) device, the identifier of the AP device and integers k, i and l;
a step of producing integer y from the secret key as group member, receiving as input the identifier of the AP device and the k, i, l and y and calculating data for forming a tag by means of the tag creating step;
a step of calculating a correctness proof text of the tag; and
an output step of outputting the tag and the correctness proof text.

27. The method according to claim 23, further comprising:
a tracing step including:
an input step of receiving as input a first set having element i of a finite group, element $\mu$ of a finite group, integer l and proof text p and a second set having element $\tau'$ of a finite group, element $\mu'$ of a finite group, integer l' and proof text p';
a first determining step of determining if the $\tau$ and the $\tau'$ are the same or not;
a second determining step of determining if the l and the l' are the same or not;
a third determining step of determining if the proof text p is correct or not;
a fourth determining step of determining if the proof text p' is correct or not; and
a step of acquiring an identifier corresponding to the outcome of calculation of the member identifying information extracting step based on a previously set correspondence table.

28. The method according to claim 24, further comprising:
a tracing step including:
an input step of receiving as input a first set having element $\tau$ of a finite group, element $\mu$ of a finite group, integer l and proof text p and a second set having element $\tau'$ of a finite group, element $\mu'$ of a finite group, integer l' and proof text p';
a first determining step of determining if the $\tau$ and the $\tau'$ are the same or not;
a second determining step of determining if the l and the l' are the same or not;
a third determining step of determining if the proof text p is correct or not;
a fourth determining step of determining if the proof text p' is correct or not; and
a step of acquiring an identifier corresponding to the outcome of calculation of the member identifying information extracting step based on a previously set correspondence table.

* * * * *

UNITED STATES PATENT AND TRADEMARK OFFICE
CERTIFICATE OF CORRECTION

PATENT NO.       : 8,121,290 B2
APPLICATION NO.  : 11/915561
DATED            : February 21, 2012
INVENTOR(S)      : Isamu Teranishi It is certified that error appears in the above-identified patent and that said Letters Patent is hereby corrected as shown below:

In The Drawings

Drawing Sheet 20 of 24: Before "AND" insert -- OF $Z\_q$ --

In The Specification

Column 11, Line 37: delete "devices" and insert -- devices 10 --
Column 13, Line 21: delete "$F[y]\{\omega\}$" and insert -- $F[y]\_\{\omega\}$ --
Column 13, Line 26: delete "($\tau$," and insert -- ($\tau'$, --
Column 15, Line 25: delete "(ID k, i))" and insert -- (ID∥k, i)) --
Column 17, Line 33: delete "cg," and insert -- <g, --
Column 18, Line 65: delete "a," and insert -- $\omega$, --
Column 20, Line 31: delete "$Z\_g$" and insert -- $Z\_q$ --
Column 20, Line 37: delete "{5}" and insert -- {4} --
Column 20, Line 43: delete "$Z\_p$" and insert -- $Z\_q$ --
Column 21, Line 15: delete "{c}" and insert -- {-c} --
Column 21, Line 18: delete "$g\_1$" and insert -- $g\_1^{\wedge}$ --
Column 21, Line 25: delete "$g\_2$" and insert -- $g'\_2$ --
Column 21, Line 56: delete "$pf\_(\{\tau,\mu\})$," and insert -- $pf\_\{\tau,\mu\}$), --
Column 21, Line 59: delete "$pf\_(\tau',\mu')$," and insert -- $pf\_\{\tau',\mu'\}$, --
Column 21, Line 61: delete "$pf\_\{\tau,\mu\}))$," and insert -- $pf\_\{\tau,\mu\})$, --
Column 24, Line 15: delete "{-s_" and insert -- {-s'_ --
Column 24, Line 22: delete "{-t_" and insert -- {-t'_ --
Column 24, Line 60: delete "$pf\_(\tau,\mu))$" and insert -- $pf\_\{\tau,\mu\})$ --
Column 25, Line 22: delete "$D\_4$," and insert -- $D\_\{4$, --
Column 32, Line 17: In Claim 27, delete "i" and insert -- $\tau$ --

Signed and Sealed this
Twenty-third Day of December, 2014

Michelle K. Lee
*Deputy Director of the United States Patent and Trademark Office*